United States Patent
Takemoto et al.

(10) Patent No.: US 8,531,448 B2
(45) Date of Patent: Sep. 10, 2013

(54) STEREOSCOPIC IMAGE DISPLAY APPARATUS, TEXT DATA PROCESSING APPARATUS, PROGRAM, AND STORING MEDIUM

(75) Inventors: Satoshi Takemoto, Gifu (JP); Goro Hamagishi, Osaka (JP); Ken Mashitani, Osaka (JP); Takatoshi Yoshikawa, Gifu (JP); Yoshihiro Hori, Gifu (JP); Keiji Horiuchi, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 831 days.

(21) Appl. No.: 10/558,270

(22) PCT Filed: May 26, 2004

(86) PCT No.: PCT/JP2004/007186
§ 371 (c)(1),
(2), (4) Date: Dec. 4, 2006

(87) PCT Pub. No.: WO2004/107765
PCT Pub. Date: Dec. 9, 2004

(65) Prior Publication Data
US 2007/0097208 A1 May 3, 2007

(30) Foreign Application Priority Data

May 28, 2003 (JP) .................................. 2003-150088
Aug. 28, 2003 (JP) .................................. 2003-305213
Feb. 24, 2004 (JP) .................................. 2004-048810

(51) Int. Cl.
*G06T 15/00* (2011.01)
(52) U.S. Cl.
USPC ............. 345/419; 345/581; 345/619; 348/42; 359/462

(58) Field of Classification Search
USPC .......... 348/51; 359/462; 358/1.13; 719/328
See application file for complete search history.

(56) References Cited

U.S. PATENT DOCUMENTS 5,945,965 A * 8/1999 Inoguchi et al. .................. 345/6
6,046,711 A * 4/2000 Kouchi ............................. 345/8

(Continued)

FOREIGN PATENT DOCUMENTS

JP 5-210679 A 8/1993
JP 8-30586 2/1996

(Continued)

OTHER PUBLICATIONS

Japanese Office Action issued in corresponding Japanese Patent Application 2003-305213.

(Continued)

*Primary Examiner* — Phi Hoang
(74) *Attorney, Agent, or Firm* — McDermott Will & Emery LLP

(57) ABSTRACT

A deviation amount of a pictographic character portion of "G" is calculated based on a description of a file, and left eye-use display data (ABCDEF GIJK) and right eye-use display data (ABCDEG HIJKL) in a portion (b) in FIG. 3 are generated. A starting location of a description of "ABCDEF-GHIJKL" is specified by an X coordinate and a Y coordinate described in the file. In addition, a process of alternately writing pixel data constituting the left eye-use display data (ABCDEF GIJK) and pixel data constituting the right eye-use display data (ABCDEG HIJKL) from a pixel data storing location of a VRAM corresponding to the coordinates (that is, one right eye-use pixel and one left eye-use pixel are alternately written one after another in a horizontal direction as a display image) is carried out.

10 Claims, 21 Drawing Sheets

(56) References Cited

U.S. PATENT DOCUMENTS

| | | | |
|---|---|---|---|
| 6,268,880 B1 | 7/2001 | Uomori et al. | |
| 7,064,754 B2* | 6/2006 | Iizuka et al. | 345/419 |
| 2002/0008906 A1* | 1/2002 | Tomita | 359/462 |
| 2002/0118275 A1* | 8/2002 | Harman | 348/51 |
| 2002/0171857 A1* | 11/2002 | Hisatomi et al. | 358/1.13 |
| 2004/0057612 A1* | 3/2004 | Tabata | 382/154 |
| 2004/0216147 A1* | 10/2004 | Yanosy et al. | 719/328 |

FOREIGN PATENT DOCUMENTS

| | | |
|---|---|---|
| JP | 8-255154 A | 10/1996 |
| JP | 9-172654 A | 6/1997 |
| JP | 10-174064 A | 6/1998 |
| JP | 2000-78611 A | 3/2000 |
| JP | 2001-283246 A | 10/2001 |

OTHER PUBLICATIONS

Chinese Office Action, w/ English translation thereof, issued in Chinese Patent Application No. CN 200480014595.0 dated Jan. 8, 2010.
European Office Action issued in application No. 04 745 338.6 issued on Apr. 10, 2012.
Miller et al., "Topic Islands—A wavelet-based text visualization system", Proceedings of the IEEE Visualization 98.

* cited by examiner

FIG. 3
(a)
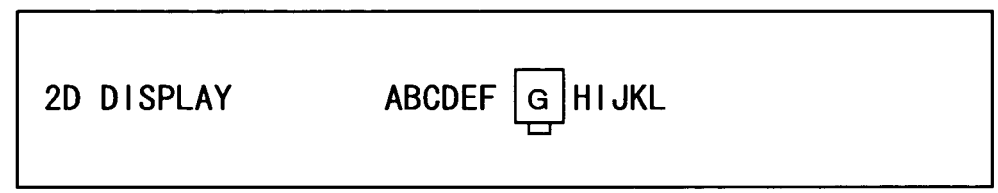
(b)
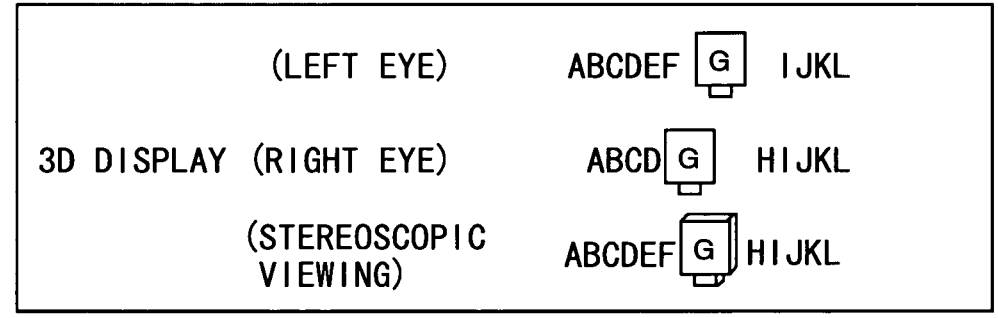
(c)
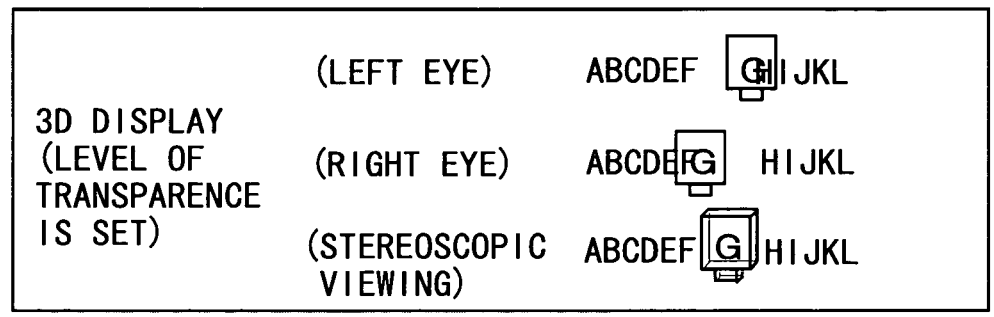

| 2D DISPLAY | ABCDEFGHIJK |

(b)

| 3D DISPLAY | (LEFT EYE) | ABCD EFGHIJK |
| | (RIGHT EYE) | ABCDEF GHIJK |
| | (STEREOSCOPIC VIEWING) | ABCD EF GHIJK |

| | |
|---|---|
| <word> | TAG DESCRIBING DISPLAY OF STRING OF CHARACTERS |
| <start_x> 100 </start_x> | X COORDINATE OF DISPLAY STARTING LOCATION |
| <start_y> 50 </start_y> | Y COORDINATE OF DISPLAY STARTING LOCATION |
| <nationality> JAPANESE </nationality> | DISPLAY LANGUAGE |
| <font> MS GOTHIC </font> | FONT IN USE |
| <size> 12 </size> | FONT SIZE IN USE |
| <hyouji> ABCDEFGHIJK </hyouji> | DISPLAY CHARACTER |
| </word> | |

(b)

> 3 D

| | |
|---|---|
| <word> | TAG DESCRIBING DISPLAY OF STRING OF CHARACTERS |
| <start_x> 100 </start_x> | X COORDINATE OF DISPLAY STARTING LOCATION |
| <start_y> 50 </start_y> | Y COORDINATE OF DISPLAY STARTING LOCATION |
| <nationality> JAPANESE </nationality> | DISPLAY LANGUAGE |
| <font> MS GOTHIC </font> | FONT IN USE |
| <size> 12 </size> | FONT SIZE IN USE |
| <hyouji> ABCD | DISPLAY CHARACTER |
|   <3d> | STRING OF CHARACTERS TO BE THREE-DIMENSIONALLY DISPLAYED |
|     E F <zurashi_L_x> 8 </zurashi_L_x> | PHASE DEVIATION AMOUNT OF CHARACTER FOR LEFT EYE (DEFAULT VALUE:0, RIGHT SIDE +) |
|     (<zurashi_R_x> , </zurashi_R_x>) | (PHASE DEVIATION AMOUNT OF RIGHT-EYE USE CHARACTER) (DEFAULT VALUE:0, LEFT SIDE +) |
|   </3d> GHIJK     (<zurashi_x>,</zurashi_x>) | PHASE DEVIATION AMOUNT (IN A CASE OF NOT BEING SET, SETTING VALUE OF THE ABOVE <zurashi_L_x> IS SET) |
| </hyouji> </word> | |

```
<word>
<start_x> 100 </start_x>          X COORDINATE OF DISPLAY STARTING LOCATION
<start_y> 50 </start_y>           Y COORDINATE OF DISPLAY STARTING LOCATION
<nationality> JAPANESE </nationality>   DISPLAY LANGUAGE
<font> MS GOTHIC </font>          FONT IN USE
<size> 12 </size>                 FONT SIZE IN USE
<sentence>                        DISPLAY CHARACTER
  ABCD
  <3d>                            STRING OF CHARACTERS TO BE THREE-
  EF                              DIMENSIONALLY DISPLAYED
    <shift> 8 </shift>            RELATIVE PHASE DEVIATION AMOUNT OF
                                  RIGHT AND LEFT CHARACTERS
                                  (DEFAULT VALUE:0, PROTRUDING +)
    <overlap> YES </overlap>      WHETHER THERE IS EROSION OR NOT
  </3d>
  GHIJK
</sentence>
</word>
```

<word>  TAG DESCRIBING DISPLAY OF STRING OF CHARACTERS

```
<word>                           TAG DESCRIBING DISPLAY OF STRING OF CHARACTERS
<start_x> 100 </start_x>         X COORDINATE OF DISPLAY STARTING LOCATION
<start_y> 50 </start_y>          Y COORDINATE OF DISPLAY STARTING LOCATION
<nationality> JAPANESE </nationality>   DISPLAY LANGUAGE
<font> MS GOTHIC </font>         FONT IN USE
<size> 12 </size>                FONT SIZE IN USE
<sentence>                       DISPLAY CHARACTER
  ABCD
  <3d>                           STRING OF CHARACTERS TO BE THREE-
                                 DIMENSIONALLY DISPLAYED
    E F
    <direction> PROTRUDING </direction>   DIRECTION OF STEREOSCOPIC VIEWING
    <shift_level> STRONG </shift_level>   RELATIVE PHASE DEVIATION LEVEL OF
                                          RIGHT AND LEFT CHARACTERS
    <overlap> YES </overlap>     WHETHER THERE IS EROSION OR NOT
  </3d>
  GHIJK
</sentence>
</word>
```

FIG. 8

```
<word>                              TAG DESCRIBING DISPLAY OF STRING OF
                                    CHARACTERS
<start_x> 100 </start_x>            X COORDINATE OF DISPLAY STARTING
                                    LOCATION
<start_y> 50 </start_y>             Y COORDINATE OF DISPLAY STARTING
                                    LOCATION
<nationality> JAPANESE </nationality>  DISPLAY LANGUAGE
<font> MS GOTHIC </font>            FONT IN USE
<size> 12 </size>                   FONT SIZE IN USE
<sentence>                          DISPLAY CHARACTER
   ABCD
   <3d>                             STRING OF CHARACTERS TO BE THREE-DIMENSIONALLY DISPLAYED
      E F
      <direction> PROTRUDING </direction>    DIRECTION OF STEREOSCOPIC VIEWING
      <shift_ratio> 60 </shift_ratio>        RELATIVE PHASE DEVIATION RATIO(%) OF RIGHT AND LEFT
                                             CHARACTERS
      <overlap> YES </overlap>               WHETHER THERE IS EROSION OR NOT
   </3d>
   GHIJK
</sentence>
</word>
```

| 3 D |
|---|

```
<word>
<start_x> 100 </start_x>              X COORDINATE OF DISPLAY STARTING LOCATION
<start_y> 50 </start_y>               Y COORDINATE OF DISPLAY STARTING LOCATION
<nationality> JAPANESE </nationality> DISPLAY LANGUAGE
<font> MS GOTHIC </font>              FONT IN USE
<size> 12 </size>                     FONT SIZE IN USE
<sentence>                            DISPLAYED CHARACTER
  ABCD
```
<word> TAG DESCRIBING DISPLAY OF STRING CHARACTERS

```
  <3d>
    E F                                           STRING OF CHARACTERS TO BE THREE-DIMENSIONALLY DISPLAYED
    <motion> FORWARD AND BACKWARD </motion>       TYPES OF MOVEMENT
    <typ_shift> 1 </typ_shift>                    REFERENCE PHASE DEVIATION AMOUNT OF RIGHT AND LEFT CHARACTERS
    <max_shift> 8 </max_shift>                    MAXIMUM PHASE DEVIATION AMOUNT OF RIGHT AND LEFT CHARACTERS
    <min_shift> -8 </min_shift>                   MINIMUM PHASE DEVIATION AMOUNT OF RIGHT AND LEFT CHARACTERS
                                                  (EACH DEFAULT VALUE:0, PROTRUDING +)
    <move_h> 5 </move_h>                          MOVING AMOUNT IN RIGHT AND LEFT DIRECTIONS
    <frequency> 1 </frequency>                    FREQUENCY OF MOVEMENT
                                                  (THE NO. OF TIMES/SECOND, RECIPROCATION/SECOND, ROTATION/SECOND)
    <repeat> 10 </repeat>                         THE NO. OF TIMES OF MOVEMENTS
    <overlap> YES </overlap>                      WHETHER THERE IS EROSION OR NOT
  </3d>
  GHIJK
</sentence>
</word>
```

FIG. 11
(a)
(b)
(LEFT EYE)  A B C D  G H I J
(RIGHT EYE) A B C  F G H I J
(3D)        A B C D  G H I J

| |
|---|
| 2D DISPLAY  A B C D E F G H I J K |

SIZE: 20

(b)

| |
|---|
| CHARACTER    A B C D E F  G H I J K<br>EXPANSION |

「E F」SIZE: 40

(c)

| |
|---|
| CHARACTER    A B C D E F G H I J K<br>EXPANSION |

「E F」SIZE: 40

FIG. 14
(a)
2 D DISPLAY
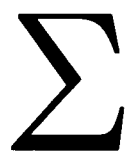
(b)
3 D DISPLAY
LEFT             RIGHT
   
FIG. 15
LEFT             RIGHT
   

FIG. 16
(a) 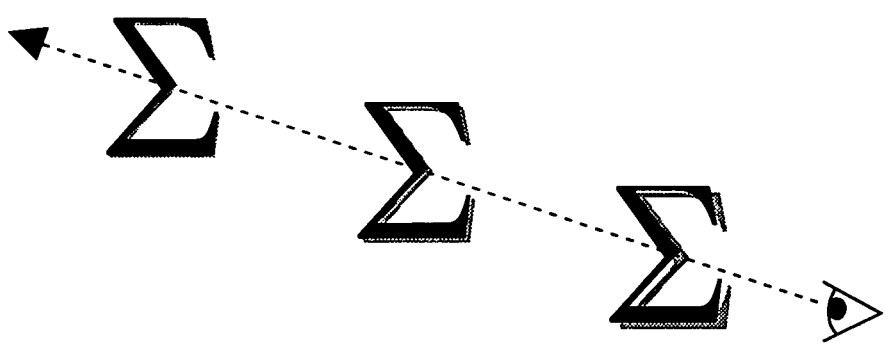
(b) 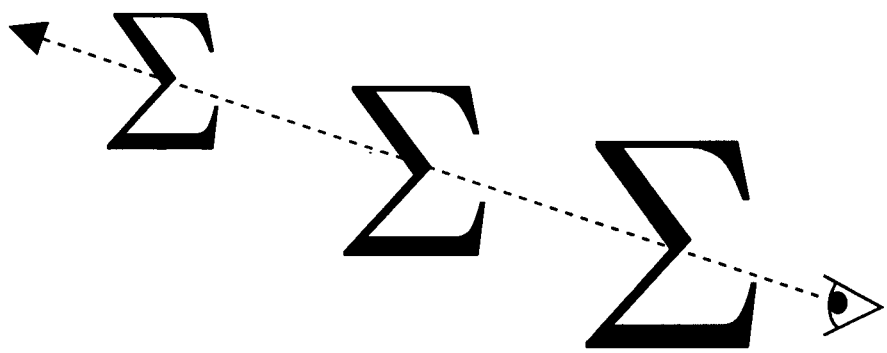
(c) 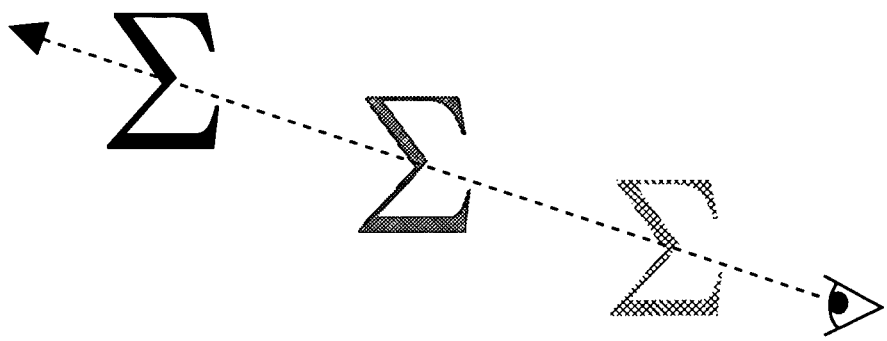

FIG. 17
(a) 2D DISPLAY
(b) 3D DISPLAY
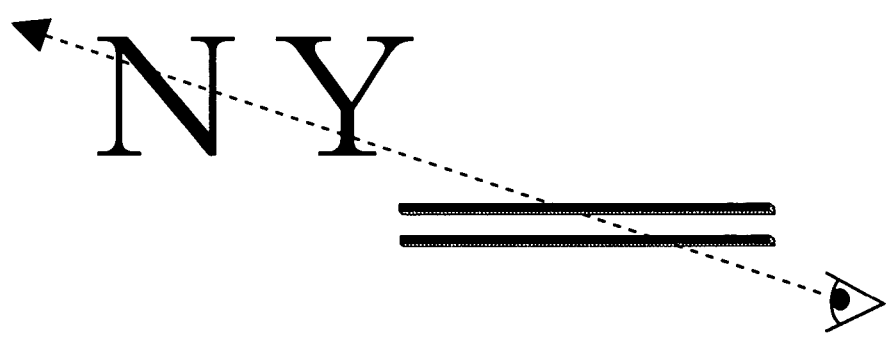
(c)
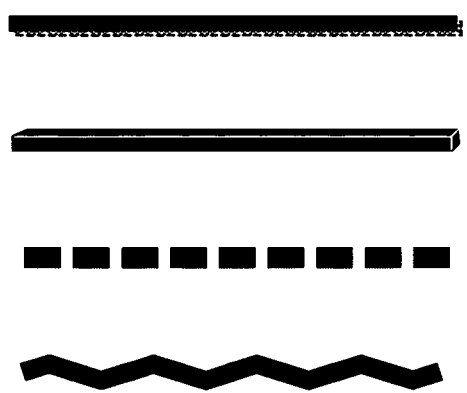

FIG. 18

| TEXT | I | | g | o | | t | o | | N | Y |
|---|---|---|---|---|---|---|---|---|---|---|
| FONT | GOTHIC | | | | | | | | | |
| SIZE | 12 | | | | | | | | | |
| BOLD | NO | | | | | | | | | |
| ITALIC | NO | | | | | | | | | |
| UNDERLINED | NO | | | | | | | | | |
| 3D DISPLAY | NO | | NO | NO | | NO | NO | | YES | YES |
| 3D INFORMATION | | | | | | | | | | |

STEREOSCOPIC IMAGE DISPLAY APPARATUS, TEXT DATA PROCESSING APPARATUS, PROGRAM, AND STORING MEDIUM

RELATED APPLICATION

This application is the U.S. National Phase under 35 U.S.C. §371 of International Application No. PCT/JP2004/007186, filed on May 26, 2004, which in turn claims the benefit of Japanese Application No. 2003-150088, filed on May 28, 2003, Japanese Application No. 2003-305213, filed on Aug. 28, 2003 and Japanese Application No. 2004-048810, filed on Feb. 24, 2004, the disclosure of which Applications are incorporated by reference herein.

TECHNICAL FIELD

The present invention relates to a stereoscopic image display apparatus, a text data processing apparatus, a program, and a storing medium.

BACKGROUND ART

As an art of performing a stereoscopic viewing, there are known various methods such as a glasses-free stereoscopic viewing method using a parallax barrier, a glasses-using stereoscopic viewing method using polarized glasses, liquid crystal shutter glasses, etc., and other methods. Furthermore, regarding images to be viewed stereoscopically, besides a live-action image, there is an image created by a three-dimensional rendering, that is, a rendering process in which an object arranged in a virtual space is projected on planes by using computer graphics. In addition, by performing the rendering process in two viewpoints, it becomes possible to create a right-eye image and a left-eye image. Furthermore, it has been proposed a stereoscopic image receiving apparatus and a stereoscopic image system for generating a stereoscopic image based on depth information extracted from a two-dimensional video signal, and the two-dimensional video signal (see Japanese Patent Laying-open No. 2000-78611). If an image file made of the two-dimensional image and the depth information is created, the stereoscopic image can be created in opening this file. Furthermore, there is proposed a method in which the stereoscopic vision viewing is performed on a receiver side by broadcasting two images as a 1-channel image (see Japanese Patent Laying-open No. H10-174064). If an image file composed of two or more images is created, it becomes possible to create the stereoscopic image when this file is opened.

It is noted that a reference document (Japanese Patent Laying-open No. H5-210679) herein shown lists an art in which a character decoration of certain characters, or of a string of characters is converted into another character decoration. That is, a character code and a control code (which indicate a manner of the character decoration) of the characters or the string of characters to be converted, and the character code and the control code (which indicate a manner of the character decoration) of the converted characters or string of characters are appropriately set. Next, according to such the set condition, the characters or the string of characters to be converted are searched from a text, and then, the searched characters or string of characters are converted into the character code and the control code of the converted characters or string of characters.

DISCLOSURE OF THE INVENTION

Problem to be Solved by the Invention

Currently, electronic character data is accompanied by not only a simple character code, but also accompanied by various attributes such as a font size, a font type, etc. It is possible to freely set these attributes in a unit of characters or a string of characters, so that it becomes possible to express the text by a wide range of manners by appropriately changing the attributes.

On the other hand, as described above, in a field of an image display technology, an image display manner using a three-dimensional stereoscopic display effect (three-dimensional effect) is under consideration and development. Herein, the three-dimensional effect is an effect for allowing an observer to recognize an image with a stereoscopic effect by applying an image having parallax to both eyes of the observer.

It is desired that an even simple text is expressed as an impressive text by using such the three-dimensional effect. For example, it is desired that in a case that there is a text file created with a word processor, etc., certain characters in such the file are stereoscopically viewed. In addition, it is desired that in a case that there is a file composed of the characters only, or the characters and the images (a bitmap image, a GIF image, a JPEG image, etc.), certain characters and image portion in such the file are stereoscopically viewed.

In view of the above circumstances, an object of the present invention is to provide a stereoscopic image display apparatus and a program, capable of displaying stereoscopically a certain character and image portions based on a file such as a text file created with a word processor, an HTML file, etc. In addition, an object of the present invention is to provide a text data processing apparatus, a program, and a storing medium storing the program, capable of readily displaying, when electronic character data in which a three-dimensional effect is produced on a character or a string of characters is transmitted by electronic mail, etc., such the electronic text data in a two-dimensional manner and without ruining an intention of a text creator, even in a case that a display apparatus on a receiver side is not provided with a function for performing a three-dimensional display.

In addition, on the contrary, an object of the present invention is to provide a text data processing apparatus, a program, and a storing medium storing the program, capable of performing a text display more impressive than a conventional two-dimensional display, by appropriately producing the three-dimensional effect on a two-dimensional display-use ordinary character or a string of characters in a display apparatus provided with a three-dimensional display function.

Means for Solving the Problem

A stereoscopic image display apparatus according to the present invention is a stereoscopic image display apparatus for generating a stereoscopic image based on a file, and comprises a means for determining a description indicating a stereoscopic viewing-use process out of descriptions in a file, a means for determining a phase deviation amount and a deviation direction of an object to be stereoscopically displayed based on the description indicating the stereoscopic viewing-use process, and a means for carrying out a rendering process of each viewpoint image of the object to be stereoscopically displayed based on the phase deviation amount and the deviation direction (Hereinafter, referred to as a first configuration in this section).

In a stereoscopic image display apparatus according to the above first configuration, the object to be stereoscopically displayed may be rendered over an object adjacent thereto, or the object adjacent thereto may be rendered over the object to be stereoscopically displayed corresponding to the phase deviation amount and the deviation direction. In addition, the object to be stereoscopically displayed, which is to be rendered over, may be rendered in such a manner as to be translucent. The rendering-over process may be executed when there is in the file a description indicating that the rendering-over process is to be carried out.

Furthermore, in a stereoscopic image display apparatus according to the above first configuration, regarding each viewpoint image of the object to be stereoscopically displayed, an object on an adjacent side of the object to be stereoscopically displayed may be rendered in such a manner that a location thereof is deviated toward a side of the deviation direction of the object to be stereoscopically displayed only by an amount equal to or larger than the phase deviation amount. In addition, a rendering process in which the location of the object on the adjacent side is deviated may be executed when there is in the file a description indicating that the rendering process in which the location of the object on the adjacent side is deviated is to be carried out.

In a stereoscopic image display apparatus according to these configurations, in a case that extent information as information indicating the phase deviation amount is described in the file, the phase deviation amount may be calculated based on information of a previously retained setting table and the extent information. In addition, in a case that the object to be stereoscopically displayed is stereoscopically displayed on a near side, the object to be stereoscopically displayed may be expanded and rendered, and in a case that the object to be stereoscopically displayed is stereoscopically displayed on a far side, the object to be stereoscopically displayed may be reduced in size and rendered.

Furthermore, a program according to the present invention enables a computer to function as a means for determining a description indicating a stereoscopic viewing-use process out of descriptions in a file, a means for determining a phase deviation amount and a deviation direction of an object to be stereoscopically displayed based on the description indicating the stereoscopic viewing-use process, and a means for carrying out a rendering process of each viewpoint image of the object to be stereoscopically displayed based on the phase deviation amount and the deviation direction (Hereinafter, referred to as a second configuration in this section).

In a program according to the above second configuration, it may be possible to enable a computer to function as a means for rendering the object to be stereoscopically displayed over an object adjacent thereto, or rendering the object adjacent thereto over the object to be stereoscopically displayed corresponding to the phase deviation amount and the deviation direction. In addition, it may be possible to enable a computer to function as a means for rendering the object to be stereoscopically displayed, which is to be rendered over, in such a manner as to be translucent. In addition, it may be possible to enable a computer to function as a means for executing the rendering-over process when there is a description indicating the rendering-over process in a file.

Furthermore, in a program according to the above second configuration, it may be possible to enable a computer to function as a means for rendering a location of an object on an adjacent side of the object to be stereoscopically displayed in such a manner as to be deviated toward a side of the deviating direction of the object to be stereoscopically displayed only by an amount equal to or larger than the phase deviation amount, regarding each viewpoint image of the object to be stereoscopically displayed. In addition, it may be possible to enable a computer to function as a means for executing a rendering process in which the location of the object on the adjacent side is deviated when there is in a file a description indicating that the rendering process in which the location of the object on the adjacent side is deviated is to be carried out.

In a program according to these configurations, it may be possible to enable a computer to function as a means for calculating, in a case that extent information as information indicating the phase deviation amount is described in the file, the phase deviation amount based on information of a previously retained setting table and the extent information. In addition, it may be possible to enable a computer to function as a means for expanding and rendering the object to be stereoscopically displayed in a case that the deviation direction is set so that the object to be stereoscopically displayed is stereoscopically displayed on a near side, and reducing in size and rendering the object to be stereoscopically displayed in a case that the deviation direction is set so that the object to be stereoscopically displayed is stereoscopically displayed on a far side.

In order to solve the above-described problems, a stereoscopic image display apparatus according to the present invention is a stereoscopic image display apparatus for generating a stereoscopic image based on a file, and comprises a means for determining whether or not there is attribute information indicating a stereoscopic viewing-use process regarding each character in the file, a means for determining a phase deviation amount and a deviation direction of a character to be stereoscopically displayed based on the attribute information, and a means for carrying out a rendering process of each viewpoint image of the character to be stereoscopically displayed based on the phase deviation amount and the deviation direction (Hereinafter, referred to as a third configuration in this section).

In a stereoscopic image display apparatus according to the above-described third configuration, an image of a shade of the character to be stereoscopically displayed may be rendered. In addition, when the character to be stereoscopically displayed is viewed on a nearer side, a shade may be rendered in such a manner that a location thereof is more greatly deviated. In addition, the shade may be rendered by the same color system of the character to be stereoscopically displayed, and by saturation and/or intensity different therefrom. Furthermore, when the character to be stereoscopically displayed is viewed on a nearer side, the character to be stereoscopically displayed may be rendered larger. In addition, when the character to be stereoscopically displayed is viewed on a nearer side, the character to be stereoscopically displayed may be rendered so that intensity of the color of the character to be stereoscopically displayed is more enhanced. Furthermore, in a case that the character to be stereoscopically displayed is a character with a strike-through, each viewpoint image of the strike-through may be rendered so that the strike-through is viewed on a nearer side than the character to be stereoscopically displayed. In addition, the strike-through of the character to be stereoscopically displayed may be rendered by any one of a shaded line, a depth line, a waveform line, or a dashed line.

Furthermore, software according to the present invention enables a computer to function as a means for determining whether or not there is attribute information indicating a stereoscopic viewing-use process regarding each character in a file, a means for determining a phase deviation amount and a deviation direction of a character to be stereoscopically displayed based on the attribute information, and a means for carrying out a rendering process of each viewpoint image of the character to be stereoscopically displayed based on the phase deviation amount and the deviation direction (Hereinafter, referred to as a fourth configuration in this section).

In a program according to the above-described fourth configuration, it may be possible to enable a computer to function as a means for rendering an image of a shade of the character to be stereoscopically displayed. In addition, it may be possible to enable a computer to function as a means for rendering a shade in such a manner that a location thereof is greatly deviated, when the character to be stereoscopically displayed is viewed on a nearer side. Furthermore, it may be possible to enable a computer to function as a means for rendering the shade by the same color system of the character to be stereoscopically displayed, and by saturation and/or intensity different therefrom. In addition, it may be possible to enable a computer to function as a means for rendering the character to be stereoscopically displayed larger, when the character to be stereoscopically displayed is viewed on a nearer side. Furthermore, it may be possible to enable a computer to function as a means for rendering the character to be stereoscopically displayed so that intensity of the color of the character to be stereoscopically displayed is more enhanced, when the character to be stereoscopically displayed is viewed on a nearer side. In addition, it may be possible to enable a computer to function as a means for rendering, in a case that the character to be stereoscopically displayed is a character with a strike-through, each viewpoint image of the strike-through so that the strike-through is viewed on a nearer side than the character to be stereoscopically displayed. Furthermore, it may be possible to enable a computer to function as a means for rendering the strike-through of the character to be stereoscopically displayed by any one of a shaded line, a depth line, a waveform line, or a dashed line.

Furthermore, one embodiment to a text data processing apparatus, and comprises a conversion rule storing means for storing a conversion rule for converting attribute information on a character or a string of characters into another attribute information, an attribute searching means for searching from text data the character or the string of characters having the attribute information corresponding to the conversion rule, and an attribute conversion means for converting according to the conversion rule the attribute information on the character or the string of characters searched by the attribute searching means, in which the conversion rule includes a rule for converting attribute information for producing a three-dimensional stereoscopic display effect on the character or the string of characters into attribute information for producing a certain decoration of a two-dimensional character effect.

In the text data processing apparatus the conversion rule includes a rule for converting the attribute information for producing the three-dimensional stereoscopic display effect into attribute information for producing a two-dimensional character decoration effect approximate to a stereoscopic display such as an italic character, a shaded character, etc.

In the text data processing apparatus the conversion rule includes a rule for changing a font size of a two-dimensional character corresponding to a level of the three-dimensional stereoscopic display effect.

Another embodiment of a text data processing apparatus, and comprises a conversion rule storing means for storing a conversion rule for converting attribute information on a character or a string of characters into another attribute information, an attribute searching means for searching from text data the character or the string of characters having the attribute information corresponding to the conversion rule, and an attribute conversion means for converting according to the conversion rule the attribute information on the character or the string of characters searched by the attribute searching means, in which the conversion rule includes a rule for converting attribute information for producing a certain decoration of a two-dimensional character effect on the character or the string of characters into attribute information for producing a three-dimensional stereoscopic display effect.

In the text data processing apparatus, the conversion rule includes a rule for converting attribute information for producing a two-dimensional character decoration effect approximate to a stereoscopic display such as an italic character, a shaded character, etc., into attribute information for producing a three-dimensional stereoscopic display effect.

In the text data processing apparatus, the conversion rule includes a rule for changing a level of the three-dimensional stereoscopic display effect corresponding to a font size of a two-dimensional character.

One embodimetn of a program for providing a computer with a text data conversion function comprises a conversion rule table for converting attribute information on a character or a string of characters into another attribute information, an attribute searching process for searching from text data the attribute information on a character or the string of characters having the attribute information corresponding to the conversion rule, an attribute conversion process for converting according to the conversion rule the attribute information on the character or the string of characters searched by the attribute searching process, in which the conversion rule table includes a rule for converting attribute information for producing a three-dimensional stereoscopic display effect on the character or the string of characters into attribute information for producing a certain decoration of a two-dimensional character effect.

In the program, the conversion rule table includes a rule for converting the attribute information for producing the three-dimensional stereoscopic display effect into attribute information for producing a two-dimensional character decoration effect approximate to a stereoscopic display such as an italic character, a shaded character, etc.

In the program, the conversion rule table includes a rule for changing a font size of a two-dimensional character corresponding to a level of the three-dimensional stereoscopic display effect.

Another embodiment of a program for providing a computer with a text data conversion function comprises a conversion rule table for converting attribute information on the character or the string of characters into another attribute information, an attribute searching process for searching from text data the character or the string of characters having the attribute information corresponding to the conversion rule, and an attribute conversion means for converting according to the conversion rule the attribute information on the character or the string of characters searched by the attribute searching process, in which the conversion rule table includes a rule for converting attribute information for producing a certain decoration of a two-dimensional character effect on the character or the string of characters into attribute information for producing a three-dimensional stereoscopic display effect.

In the program, the conversion rule table includes a rule for converting attribute information for producing a two-dimensional character decoration effect approximate to a stereoscopic display such as an italic character, a shaded character, etc., into attribute information for producing a three-dimensional stereoscopic display effect.

In the program, the conversion rule table includes a rule for changing a level of the three-dimensional stereoscopic display effect corresponding to a font size of a two-dimensional character.

A storing medium for storing the program.

According to the present invention, it is possible to stereoscopically display an arbitrary character and image portions based on a file such as an HTML file. In addition, according to the present invention, it is possible to stereoscopically display an arbitrary character portion based on attribute information on a character described in a file.

The text data processing apparatus is configured for converting the attribute information on a character or a string of characters on which a three-dimensional effect is produced into the attribute information for producing a certain two-dimensional character decoration so as to reconstruct text data, so that it is possible for even a display apparatus not being provided with a three-dimensional function to appropriately emphasize and display the character or the string of characters. Therefore, it is possible to smoothly two-dimensionally display text data including the character or the string of characters on which the three-dimensional effect is produced without ruining an intention of a text creator.

In addition, it is possible to display the character or the string of characters on which the three-dimensional effect is produced in a two-dimensional character decoration manner approximate to a three-dimensional effect, and thus, it becomes possible to two-dimensionally display these characters in a manner further approximate to an intention of a text creator.

Furthermore, a font size of a two-dimensional character is changed corresponding to a level of the three-dimensional stereoscopic effect, so that it is possible to further emphasize the character or the string of characters on which the three-dimensional effect is produced, and thus, it becomes possible to further bring a display state to an intention of a text creator.

The text data processing apparatus is configured for converting the attribute information for producing a certain decoration of a two-dimensional character effect into the attribute information for producing a three-dimensional character decoration effect so as to reconstruct text data, so that even in a display apparatus provided with a three-dimensional display function, it is possible to display the character or the string of characters in a manner more impressive than an ordinary two-dimensional display, and thus, it becomes possible to carry out a text display in which an intention of an text creator is further emphasized.

In addition, it is possible to display in a three-dimensional manner the character or the string of characters on which a two-dimensional character decoration effect approximate to a three-dimensional effect is produced, and thus, it is possible to more appropriately emphasize an intention of a text creator.

Furthermore, a depth of the three-dimensional effect is appropriately changed corresponding to a font size of the two-dimensional character, so that it is possible to produce a three-dimensional effect corresponding to the font size, and thus, it becomes possible to more appropriately emphasize an intention of a text creator.

It is noted that a storing medium is provided for storing a program. Therefore, it is possible to exhibit the same effect as described above.

Other effects exhibited in the present invention will become more apparent from the following detailed description of the embodiments described below.

BEST MODE FOR PRACTICING THE INVENTION

The features of the present invention will become more apparent from the following detailed description. However, the following embodiment is therefore to be considered in all respects as illustrative and not restrictive, and the invention may be embodied in other specific forms without departing from the spirit or essential characteristics thereof.

Hereinafter, a stereoscopic image display apparatus and a program of the present invention will be described based on FIG. 1 to FIG. 13.

FIG. 1 shows one example of architecture of a personal computer (stereoscopic image display apparatus). A CPU (central processing unit) 1 is connected to a north bridge 2 having a system control function, and a south bridge 3 having interface functions such as a PCI bus, an ISA bus, etc. To the north bridge 2, a video card 5 is connected via a memory 4, and an AGP (Accelerated Graphics Port). In addition, to the south bridge 3, a USB (Universal Serial Bus) interface 6, a hard disk drive (HDD) 7, a CD-ROM device 8, etc., are connected.

FIG. 2 shows a generally used video card 5. In receipt of an instruction from the CPU 1 via the AGP, a VRAM (video memory) controller 5b controls writing rendering data into a VRAM 5a and reading out the same from the VRAM 5a. A DAC (D/A (digital to analog) converter) 5c converts digital video data from the VRAM controller 5b into an analog video signal, and supplies this video signal to a personal computer-use monitor 12 via a video buffer 5d. In such a video display process (rendering process), a right-eye image and a left-eye image are generated, and these images are alternately rendered in a vertical stripe shape, and so forth. As a result, a stereoscopic image display process is carried out.

The personal computer is provided with Internet connection environment, and is capable of receiving an HTML file or an XML file (for example, a text file, electronic mail, the HTML file, the XML file, etc.), for example, from a transmission-side device configured to be a server on the Internet, etc. In addition, as a result of being provided with a liquid crystal barrier on the above-described monitor 12, for example, the personal computer becomes possible to perform both a non-stereoscopic image display and a stereoscopic image display. If stereoscopic images are formed by alternately arranging the right-eye images and the left-eye images in a vertical stripe shape, for example, a control of the CPU 1 forms a light-shielding area in the vertical stripe shape in the liquid crystal barrier. Furthermore, if the stereoscopic images are displayed in one portion of a screen (a window portion where a file is reproduced, or one image portion in the HTML file), it is possible to control by the CPU 1 a size and a location where the light-shielding area in the vertical stripe shape is formed based on the coordinates and a size of the window or one image portion. In addition to the liquid crystal barrier, it may be possible to use a normal barrier (having a barrier stripe formed fixedly at a predetermined pitch). Furthermore, since the personal computer mounts browser software (viewer), the personal computer (viewer) is capable of opening the file, and displaying the same on the monitor 12.

Next, a stereoscopic viewing-use rendering process of a file by the personal computer (browser software) will be described based on FIG. 3 to FIG. 4. FIG. 3 shows a display example of a sentence of "ABCDEFGHIJKL", a portion (a) of FIG. 3 shows an example of a non-stereoscopic display, and portions (b), (c) of FIG. 3 show an example of a stereoscopic display of a pictographic-character portion of "G" (where "G" looks as if to be protruded toward an observer). As the portion (b) of FIG. 3 shows, the pictographic-character portion of "G" is deviated to a right side by certain pixels in order to serve as the left-eye image (as a result of "G" being deviated, a portion of "H" is hidden (eroded)), and the pictographic-character portion of "G" is deviated to a left side by certain pixels in order to serve as the right-eye image (as a result of "G" being deviated, a portion of "F" is hidden (eroded)). Herein, a deviation amount of the pictographic-character portion of "G" is calculated based on a description in the file, and left eye-use display data (ABCDEF GIJK) in the portion (b) of FIG. 3 and right eye-use display data (ABCDEG HIJKL) are generated. A starting location of the description of "ABCDEFGHIJKL" is described in the file, and is specified by an X coordinate indicated by <start x>100</start x> and a Y coordinate indicated by <start y>50</start y>, for example. In addition, carried out is a writing process in which pixel data composing the left eye-use display data (ABCDEF GIJK), and pixel data composing the right eye-use display data (ABCDEG HIJKL) are alternately written from a pixel data storing location of the VRAM corresponding to the coordinates (that is, one pixel of right eye-use pixels and one pixel of left eye-use pixels are alternately written in a horizontal direction as a display image). It is noted that the portion (c) of FIG. 3 shows a display example in which a portion that "G" and "H" are superposed and a potion that "G" and "F" are superposed are translucent. In order to compose the image in such a manner as to be translucent, it may be possible to carry out a process in which a ½ (half) value of one image data and a ½ (half) value of the other image data are added is evaluated, and the evaluated value is used as the image data.

FIG. 4 shows a display example of a sentence such as "ABCDEFGHIJK", a portion (a) of FIG. 4 shows an example of a two-dimensional display, and a portion (b) of FIG. 4 shows an example of a stereoscopic display of a portion "EF" (where "EF" look as if to be protruded toward an observer). In the portion (b) of FIG. 4, as a result of "GHIJK", a non-stereoscopically displayed portion, being deviated, adjacent characters are prevented from being hidden (eroded).

A portion (a) of FIG. 5 shows a description example of a file for the non-stereoscopic display of a sentence such as "ABCDEFGHIJK", a portion (b) of FIG. 5 shows a description example of a file for a stereoscopic display of a portion "EF" in a sentence of "ABCDEFGHIJK" (not eroded). The personal computer (browser software) determines a description portion indicating a stereoscopic viewing-use process in descriptions in the file. In the example of FIG. 5, the personal computer determines that a portion sandwiched by <3d> and </3d> is the description portion indicating that the stereoscopic viewing-use process is to be carried out, and in addition, determines a phase deviation amount and a deviation direction of objects to be stereoscopically displayed (characters to be stereoscopically displayed, images to be stereoscopically displayed) based on the description portion indicating that the stereoscopic viewing-use process is to be carried out. In the example of the portion (b) of FIG. 5, the personal computer recognizes that the portion "EF" is the characters to be stereoscopically displayed. Furthermore, there is a description of <zurasi L X>8</zurasi L X>, and based on this description, the personal computer determines that the phase deviation amount of the left eye-use characters is eight pixels to a right side. In addition, there is a description of <zurasi R X>, </zurasi R X>, and based on this description, it is possible to similarly define the deviation amount of the right eye-use characters. However, this definition is herein omitted (not described in reality). Therefore, the personal computer determines that deviation amount is a default value (0 (zero)). Based on the phase deviation amount and the deviation direction thus determined, the personal computer carries out a right eye-use image rendering and a left eye-use image rendering of the characters to be stereoscopically displayed. It is noted that this example is an example where there is no erosion, and the personal computer (browser software) carries out a rendering process where a location of the objects (characters or image) on an adjacent side of the object to be stereoscopically displayed is deviated to a side of the deviation direction of the object to be stereoscopically displayed by an amount equal to or larger than the phase deviation amount. In the example of the portion (b) of FIG. 5, based on a description of <zurasi X>, </zurasi X> (this description is omitted in reality. In such the case, a value of <zurasi L X>, that is, 8 is set) described after "GHIJK", the personal computer carries out a rendering process where all characters of "GHIJK" are shifted by eight pixels to a right side.

Thus, the personal computer (browser software) determines the object to be stereoscopically displayed, the phase deviation amount, and the deviation direction according to meanings of the above descriptions so as to carry out the right eye-use image rendering process and the left eye-use image rendering process.

It is noted that it is needed that the phase deviation amounts of the portion to be non-stereoscopically displayed (GHIJK) are made equal between the left eye-use image and the right eye-use image. The deviation amount of the portion to be stereoscopically displayed (EF) is to be changed corresponding to a protruding amount (or a depth amount). In addition, the deviation amount of the portion to be stereoscopically displayed and that of the portion to be non-stereoscopically displayed may be different. However, it is needed that "the phase deviation amount of the 3D (three-dimensionally) displayed portion" is equal to or smaller than ($\leqq$) "the phase deviation amount of 2D (two-dimensionally) displayed portion". Otherwise, the erosion is to be occurred. In addition, in order to carry out the stereoscopic display of each object ("E" "F") more effectively, it may be possible that each object is separated (in the above example, "E" and "F"), and the phase deviation amounts are applied to each of the objects.

FIG. 6 shows another description example (presence or absence of the erosion is displayed by tags). The tags of <shift>8</shift> indicate that relative phase deviation amounts of the left eye-use image and the right eye-use image are + (plus) 8. The tags of <overlap>YES</overlap> define that there is the erosion.

The Relative Phase Deviation Amounts of the Left Eye-use Image and the Right Eye-use Image + (positive: protruding): deviate the left eye-use characters to right relative to the right eye-use characters (deviate eight pixels).

− (negative: depth): deviate the right eye-use characters to right relative to the left eye-use characters (deviate eight pixels).

Whether there is the erosion or not

Yes: deviate "EF" equally to right and left sides (deviate by each four pixels).

Not deviate "GHIJK".

No: deviate "EF" to right only (deviate by eight pixels).

Deviate "GHIJK" to right (deviate eight pixels) by the same value (absolute value) as the relative phase deviation amount of the right eye-use and left eye-use characters. That is, the personal computer (browser software) determines the characters to be stereoscopically displayed, the phase deviation amount, and the deviation direction according to the meanings of the above descriptions so as to carry out the right eye-use image rendering process and the left eye-use image rendering process.

FIG. 7 shows another description example (the protruding amount is shown by a level).

Stereoscopic Direction

Protruding: deviate the left eye-use characters to right relative to the right eye-use characters.

Depth: deviate the right eye-use characters to left relative to the left eye-use characters.

A Relative Phase Deviation Level of the Right Eye-use and Left Eye-use Characters A relationship between the level and the number of pixels is defined. A specific number of pixels corresponding to the definition is previously stored in a memory of the personal computer as a setting table.

Strong: deviate eight pixels

Medium: deviate four pixels

Weak: deviate two pixels

Whether there is the erosion or not

Yes: deviate "EF" equally to right and left sides (deviate by each four pixels).

Not deviate "GHIJK".

No: deviate "EF" to right only (deviate by eight pixels)

Deviate "GHIJK" to right (deviate by eight pixels) by the same value (absolute value) as the relative phase deviation amount of right eye-use and left eye-use characters. That is, the personal computer (browser software) determines the stereoscopically displayed-characters, the phase deviation amount, and the deviation direction according to the meanings of the above descriptions so as to carry out the right eye-use image rendering process and the left eye-use image rendering process.

FIG. 8 shows another description example (protruding amount is expressed by a ratio). The tags of <shift ratio>60</shift ratio>indicate that a relative phase deviation ratio of the right eye-use image and the left eye-use image is 60%.

Stereoscopic Direction

Protruding: deviate the left eye-use image to right relative to the right eye-use image.

Depth: deviate the right eye-use image to right relative to the left eye-use image.

A maximum value of the relative phase deviation of the right eye-use and left eye-use characters is 10. This information is previously stored in the memory of the personal computer as the setting table.

N %: deviate by 10·N/100 pixels (if N is equal to (=) 60, then, deviate by six pixels). Numerals after the decimal point are rounded down or up to a nearest integer number.

The maximum value may be specified by the user, or the display information may serve as the maximum value (that is, the maximum value differs depending on a size of a display).

Whether there is the erosion or not.

Yes: deviate "EF" equally to right and left (deviate by each three pixels).

Not deviate "GHIJK".

No: deviate "EF" to right only (deviate by each six pixels)

Deviate "GHIJK" to right (deviate six pixels) by the same value (absolute value) as the relative phase deviation amount of right eye-use and left eye-use characters. That is, the personal computer (browser software) determines the stereoscopically displayed-characters, the phase deviation amount, and the deviation direction according to the meanings of the above descriptions so as to carry out the right eye-use image rendering process and the left eye-use image rendering process.

FIG. 9 shows another description example (shows a movement).

Movement

Backward and forward: start from a reference phase deviation amount, and move backwardly and forwardly in a reciprocating manner between a maximum phase deviation amount and a minimum phase deviation amount.

Right and left: start from a middle position of move_h by the reference phase deviation amount, and move to right and left in a reciprocating manner.

From left to right: move from left to right, and when reached to right, start moving from left once again (movement amount is move_h).

From right to left: move from right to left, and when reached to left, start moving from right once again (movement amount is move_h).

Rotation: start from a state that the character faces toward the user in a non-stereoscopic manner (2D), and rotate according to a supplemental description described later.

Rest: rest at the reference phase deviation amount (no movement)

Besides, also possible to move from forward to backward, and from backward to forward.

The Number of Times of Movements

Display the movements of a designated number of times, return to a start state, and suspend. In a case that 0 (zero) is designated, repeat infinitely.

Whether there is the erosion or not.

Yes: deviate "EF" equally to right and left.

Not deviate "GHIJK".

No: deviate "EF" to right only.

Deviate "GHIJK" to right by the largest value, out of absolute values of typ_shift, max_shift, and min_shift. In a case of moving to right and left, move_h is further added on the largest value.

It is noted that the tags to be used change depending on kinds of movements, so that in a case that unnecessary tags are described, the personal computer (browser software) ignores the unnecessary tags.

Complement 1: A Method of Rotation

The easiest method of realizing the rotation is a method in which a normal rotation of the characters is used and the rotated characters are taken out by different angles. It can be said that characters to be rotated as shown in FIG. 10 is a graphic form of the characters "EF" viewed from different angles, so that it becomes possible to stereoscopically view the characters as a result of two graphic forms of characters having slightly different angles being the right and left images. At this time, there exists a protruding portion and a depth portion in the characters of "EF", so that the phase deviation amount changes depending on a region (pixel) of the characters. Out of these changing states, a state having the strongest parallax is specified by max_shift, and min_shift. Based upon this value, it is possible to determine a rendering location of the region of the characters.

Complement 2: A Stereoscopic Method

The above cases are achievable in every stereoscopic method. In a case that the number of viewpoints is larger than 2, or in a case of four viewpoints, for example, the phase deviation amounts of a first viewpoint character, a second viewpoint character, a third viewpoint character, and a fourth viewpoint character are determined. In addition, in a case of multi-viewpoints, a process of not allowing the characters to be eroded may differ. In a case of four viewpoints, "GHIJK" is deviated only by deviated amounts of the first viewpoint character and the fourth viewpoint character (the relative phase deviation amount of right eye-use and left eye-use characters·(times) 3). However, it is noted that thus, a composing process, and a process at a time that there is the erosion change depending on the kinds of the stereoscopic methods or the number of viewpoints, so that such information may be applied in advance. It is possible to apply a content for the composing process by a function.

That is, the personal computer (browser software) determines the characters to be stereoscopically displayed, the phase deviation amount, the deviation direction, etc., according to the meanings of the above descriptions, information on the number of viewpoints, the function, etc., so as to carry out rendering processes of the first viewpoint character, the second viewpoint character, the third viewpoint character, and the fourth viewpoint character.

A portion (a) of FIG. 11 shows another description example (whether or not there is the erosion, and a level of transparency are expressed by the tags), and a portion (b) of FIG. 11 shows a descriptive diagram showing a rendering process.

Relative Phase Deviation Amount of Right Eye-use and Left Eye-use Characters

+ (positive: protruding): deviate the left eye-use characters to right relative to the right eye-use characters (deviate by eight pixels).

− (negative: depth): deviate the right eye-use characters to right relative to the left eye-use characters (deviate by eight pixels).

Whether or not there is the Erosion (<overlap>)

Yes: deviate the pictographic character equally to right and left (deviate by each four pixels).

Not deviate "GHIJK".

No: deviate the pictographic character to right only (deviate by eight pixels).

Deviate "GHIJK" to right by the same value (absolute value) as the relative phase deviation amount of the right eye-use and left eye-use characters (deviate by eight pixels).

Priority of Display (<priority>)

1: display in such a manner that the characters to be stereoscopically displayed are placed on an upper layer (non-stereoscopically displayed characters to be eroded are hidden)

2: display in such a manner that the characters to be stereoscopically displayed are placed on a lower layer 0: depend on a browser (player) for displaying In a case that these tags are not set (default), the value is 0 (zero)

According to the level of transparency (<transparency>M</transparency>) being described, the level of transparency of the characters (pictographic characters) to be displayed is set by M %. In a case of a default (when the setting is not made), the level of transparency is 0 (zero) %. For example, if data of an R pixel of an object to be specified as transparent is R1, and data of the R pixel of an object overlapped thereon is R2, it is possible to calculate rendering R pixel data as in (R2·M/100+R1·(1−M/100)).

Incidentally, in a case of stereoscopically viewing the object as if to be protruding, as FIG. 12 shows, a sensory character width F is smaller than an original character width D. For overcoming this, in a case that the characters are non-stereoscopically displayed according to a character size described in the file (specified sized character), a fabricating process in which the browser doubles in size the characters of "EF", which are to be stereoscopically displayed, for example, is executed on the string of a characters shown in a portion (a) of FIG. 13. After this process, the rendering processes of the right eye-use image and the left eye-use image (phase deviation process) are to be carried out. In a case of the setting that there is no erosion, a phase of "GHIJK", too, is to be deviated as shown in a portion (b) of FIG. 13. On the other hand, in a case of the setting that there is the erosion, a rendering process is carried out as shown in a portion (c) of FIG. 13.

As shown in FIG. 12, there is a relationship that D: (A+B) is equal to (=) F:B, C:A is equal to (=) E:B, and this leads to F/D equal to (=) E/(E+C). As a result of the protrusion, the characters become E/(E+C)-times (shrink), so that the characters are magnified by (E+C)/E-times in advance, and displayed as such. E is a fixed number of approximately 65 mm (millimeters). In a case that the phase deviation amount that corresponds to a parallax amount of C equal to (=) 65 mm (millimeters) is set, for example, the observer may feel that the characters are reduced to ½, so that the characters are to be rendered in such a manner as to be doubled in size in advance. Herein, the personal computer (browser) retains pixel pitch information of the personal computer's monitor 12. For example, the personal computer has a table on which a pixel pitch based on a screen inch size and screen resolution is obtained, and as a result of the user inputting the screen inch size and the screen resolution, for example, the pixel pitch (mm: millimeter) is obtained. The personal computer (browser) evaluates the value of (E+C)/E based on C (mm) obtained by multiplying the phase deviation amount (the number of pixels) in a file description by the pixel pitch and E equal to (=) 65 mm, and applies a pixel interpolation (expansion process) to the original character based on this value ((E+C)/E). Or, the personal computer (browser) determines the character size that satisfies a size obtained by multiplying the original character size by the value of (E+C)/E, obtains pixel data of "EF" of this character size, and renders the characters. At a time of this rendering, the personal computer (browser) renders by determining coordinates so that a center the expanded "EF" is placed at the center of upper and lower limits of a row of the string of characters. For example, when the number of vertical pixels of the original characters is 20, and the number of vertical pixels of the expanded characters is 40, as a result of an arithmetic operation of (40−20)/2=10, the personal computer (browser) renders the characters of "EF" by deviating downwardly by 10 pixels in a vertical direction relative to a reference location (bottom location relative to the row area).

It is noted that the above example illustrates the personal computer in which the file is recognized and then, the image is displayed. However, in addition thereto, the stereoscopic image display apparatus may be a digital broadcast receiver capable of receiving data broadcast (BML file) and displaying the image, a mobile telephone provided with Internet connection environment and an image displaying function, and etc.

Next, another example of the stereoscopic rendering process of the file by the personal computer (viewer) will be described based on FIG. 14 to FIG. 17. A portion (a) of FIG. 14 shows a character display example of "Σ" having a non-stereoscopic (2D) character attribute, and a portion (b) of FIG. 14 shows a character display example of "Σ" having a stereoscopic (3D) character attribute.

In the character display example of "Σ" having the stereoscopic (3D) character attribute, not only images of right and left viewpoints of the character are rendered, but also a shade of the character is rendered (a shade portion is displayed in a fainter manner than the character in the portion (b) of FIG. 14). In a case of displaying the character of "Σ" in such a manner as to be protruded toward the user, a left eye-use image may be deviated to a right side by a certain number of pixels relative to an original display location of a character to be displayed, and a right eye-use image may be deviated to a left side by a certain number of pixels relative to the original display location of the character to be displayed.

As the phase deviation amount, the number of pixels to be deviated in the characters may be described as the character attribute information, or a degree of deviating pixels may be described. As the degree of deviating pixels, it may be so determined on the software that a degree 1 means that the characters are deviated only by two pixels, and a degree 2 means that the characters are deviated only by four pixels, for example. In addition, the phase deviation amount may be determined based on the character size, that is, the character attribute information. For example, there is a method for allowing the phase deviation amount to be proportional to the character size. In this case, a proportional constant number value is retained on a software side, and a process for multiplying the character size by this proportional constant number value is carried out, and as a result, it becomes possible to determine the phase deviation amount. Or, a corresponding table of the character size and the phase deviation amount may be prepared on the software.

Furthermore, regarding the deviation direction, how the character is viewed (protruding=0, depth=1, etc.) may be retained in the personal computer (viewer) as the character attribute. In addition, in rendering the character (character to be stereoscopically displayed) and the shade to which the deviation process is applied, the personal computer carries out a process in which pixel data constituting the left eye-use display data and pixel data constituting the right eye-use display data are alternately written from the pixel data storing location of the VRAM corresponding to rendering coordinates (as the display image, one right eye-use pixel and one left eye-use pixel are alternately written one after another in a horizontal direction).

The shade of the character to be stereoscopically displayed may be created in such a manner that a character in the same shape as the character to be stereoscopically displayed is deviated by a certain number of pixels and rendered in a right-side position of the characters, etc., and is rendered in black or gray, etc., for example. Then, in a case that the character to be stereoscopically displayed with a shade is rendered, it may be possible to carry out a process in which the character to be stereoscopically displayed and the shade are set as one, and these two are deviated by the same phase, and in addition a process in which the phase deviation amounts of the character to be stereoscopically displayed and the shade differ. For example, when the left eye-use character is deviated by four pixels to a right side relative to the original display location, the shade of this character may be deviated by only two pixels to a right side, and when the right eye-use character is deviated by four pixels to a left side relative to the original display location, the shade of this character may be deviated by only two pixels to a left side.

The character may own the phase deviation amount in rendering the shade as the character attribute. Or, the personal computer (viewer) may carry out an arithmetic calculation process on its own side so as to generate the phase deviation amount of the shade based on the phase deviation amount of the character, that is, the phase deviation amount in rendering the shade is made half the phase deviation amount of the character, and so forth.

Furthermore, in a case that the character to be stereoscopically displayed is rendered with the shade, and the character to be stereoscopically displayed is protruded toward the user, as FIG. 15 shows, it may be possible that the shade (shade portion is displayed in a fainter manner than the character in FIG. 15) is displayed in the original display location of the character to be stereoscopically displayed, and only the character to be stereoscopically displayed is displayed in such a manner as to be deviated. In this case, the shade is viewed as if to be on the same plane surface as other non-stereoscopically displayed characters, and the character to be stereoscopically displayed is viewed as if to be in a location more protruded toward the user than the non-stereoscopically displayed characters.

Furthermore, in a case of rendering the character to be stereoscopically displayed with the shade, as a portion (a) of FIG. 16 shows, the personal computer (viewer) renders the shade of the character to be stereoscopically displayed with the shade in such a manner that a location of the shade is deviated greater in a case that the character to be stereoscopically displayed is viewed on a nearer side than a case that the character to be stereoscopically displayed is viewed on a farther side (it is possible to determine by the deviation direction and the deviation amount). Such the process may be executed by a process in which a distance between the character to be stereoscopically displayed and the shade is changed corresponding to the phase deviation amount in a case that a deviating process in which the character to be stereoscopically displayed and the shade are set as one and deviated by the same amount is carried out, or as described before, carried out is a process in which the location of the shade is viewed to be deviated greatly by applying parallax to the shade itself as a result of making the phase deviation amount in rendering the shade half the phase deviation amount of the character, and so on.

A color of the shade is not limited to black, or grey, described above, and it is possible to render the color of the shade by changing saturation and/or intensity of the shade by using the same color system (the same hue or approximate hue) as the character to be stereoscopically displayed. For example, the color of the shade is displayed to be darker or brighter than the color of the character to be stereoscopically displayed. In a case that an image process is carried out based on RGB, if all of an R value, a G value, and a B value are lowered by a certain amount, the shade becomes darker, and on the contrary, all of the values are made higher by a certain amount, the shade becomes brighter. In addition, the shade may be rendered in such a manner that an arithmetic calculation process in which the R value, the G value, and the B value are converted into HIS (Hue: Saturation: Intensity) and the saturation is changed is carried out, and the HIS is once again converted into the R value, the G value, and the B value. The character may own the character attribute, which is about whether the color of the shade is one fixed color or a color according to the color of the character. The personal computer (viewer) is to carry out a rendering-color selection process based on the character attribute.

Incidentally, in a case of allowing the character to be stereoscopically displayed as if to be protruded, as FIG. 12 described above shows, the sensory character width F becomes smaller than the original character width D. Consequently, instead of rendering the character to be stereoscopically displayed according to the original character size indicated in the original character attribute, a fabricating process for doubling the character size is executed, for example. After this process, rendering processes (phase deviation process) for the right eye-use image and the left eye-use image are to be carried out.

As shown from FIG. 12, there is a relationship that D:(A+B) is equal to (=) F:B, C:A is equal to (=) E:B, and this leads to F/D equal to (=) E/(E+C). As a result of the protrusion, the characters become E/(E+C)-times (shrink), so that the characters are magnified by (E+C)/E-times in advance, and displayed as such. E is a fixed number of approximately 65 mm (millimeters). In a case that the phase deviation amount that corresponds to a parallax amount of C equal to (=) 65 mm (millimeters) is set, for example, the user may feel that the characters are reduced to ½, so that the characters are rendered by double in size in advance, and displayed as such. Herein, the personal computer (viewer) retains pixel pitch information of the personal computer's monitor 12. The personal computer (viewer) keeps a table on which a pixel pitch is obtained based on a screen inch size and screen resolution, and obtains the pixel pitch (millimeters, (mm)) as a result of the user inputting the screen inch size and the screen resolution, for example.

The personal computer (viewer) evaluates the value of (E+C)/E based on C (mm) obtained by multiplying the phase deviation amount (the number of pixels) in the character attribute by the pixel pitch and E equal to (=) 65 mm, and applies a pixel interpolation (expansion process) to the original character based on this value ((E+C)/E). Or, the personal computer (viewer) determines the character size that satisfies a size obtained by multiplying the original character size by the value of (E+C)/E, obtains pixel data of "EF" of this character size, and renders the characters. At a time of this rendering, the personal computer (viewer) renders by determining coordinates so that a center the expanded "EF" is placed at the center of upper and lower limits of a row of the string of characters. For example, when the number of vertical pixels of the original characters is 20, and the number of vertical pixels of the expanded characters is 40, as a result of an arithmetic operation of (40−20)/2=10, the personal computer (viewer) renders the characters of "EF" by deviating downwardly by 10 pixels in a vertical direction relative to a reference location (bottom location relative to the row area).

It is noted that in the above process, the sensory width of the character to be viewed as if to protrude is the same as the original character width. However, as shown in a portion (b) of FIG. 16, the personal computer (viewer) may execute a process in which the larger the protruding amount, the larger a sensory effect of the character than the original size. In addition, the personal computer may execute a process in which the larger the depth amount, the smaller the sensory effect of the character than the original size (thinning-out of pixels constituting the character, etc.).

Furthermore, as a portion (c) of FIG. 16 shows, the personal computer (viewer) displays the character in such a manner that the larger the protruding amount of the character to be stereoscopically displayed, the brighter the character, and the larger the depth amount of the character, the darker the character. In a case that the image process is carried out based on RGB, if all of an R value, a G value, and a B value are lowered by a certain amount, the character to be stereoscopically displayed becomes darker, and on the contrary, all of the values are made higher by a certain amount, the character to be stereoscopically displayed becomes brighter.

In addition, as shown in a portion (a) of FIG. 17, in a case that the characters to be displayed are non-stereoscopically displayed characters with strike-throughs, the personal computer (viewer) renders two horizontal lines placed on "NY", i.e., the displayed characters On the other hand, in a case that the characters to be displayed are the characters to be stereoscopically displayed with strike-throughs, as a portion (b) of FIG. 17 shows, the personal computer (viewer) renders each viewpoint image of the strike-throughs so that the strike-throughs are viewed on a side nearer than the characters to be stereoscopically displayed. For example, in a case that left eye-use characters of "NY" are deviated by each two pixels to a right side relative to the original display location, pixels of the strike-throughs are deviated by four pixels to a right side, and in a case that right eye-use characters of "NY" are deviated by each two pixels to a left side relative to the original display location, pixels of the strike-throughs are deviated by four pixels to a left side. The character may own the phase deviation amount in rendering the strike-throughs as the character attribute. Or, the personal computer (viewer) may carry out an arithmetic calculation process on its own side so as to generate the deviation amount of the shade based on the phase deviation amount of the character, that is, the phase deviation amount in rendering the strike-throughs is made half the phase deviation amount of the character, and so forth.

As a portion (c) of FIG. 17 shows, the personal computer (viewer) renders the strike-throughs of the characters to be stereoscopically displayed by any one of a shaded line, a thick line, a waveform line, a dashed line. Compared to a case that a simple line is rendered as the strike-though, a case that the strike-through is rendered as described above is easier to cause a difference to the right and left viewpoint images regarding the strike-through, and in addition, a stereoscopic feeling of the strike-through is improved.

FIG. 18 is a descriptive diagram showing a sentence of "I go to NY", and attribute information of each character constituting this sentence. Besides normal character attributes such as "font", "size", and etc., each character has an attribute of "3D display" (Yes/No). In addition, as "3D information", each character has attributes such as "protruding/depth" (0/1), "deviation degree" (for example, specified by values between 1 to 5), "shaded" (Yes/No), "specify shade as a shallow color" (Yes/No), "specify a change of shade deviation amount" (Yes/No), "specify a change of character brightness" (Yes/No), "specify a change of character size" (Yes/No), etc., for example. The personal computer (viewer) recognizes the character indicated by "Yes" in the "3D display", as the character to be stereoscopically displayed, and based on each attribute information of "3D information", determines the phase deviation amount and the deviation direction according to the meanings of the above attributes as described before. Furthermore, the personal computer (viewer) carries out a character color change, a character size change, a shade rendering, etc., and carries out the rendering processes for the right eye-use image and the left eye-use image.

It is noted that in a case of allowing a portion of the sentence (NY, for example) to be stereoscopically displayed, there is a case that the characters to be stereoscopically displayed are rendered in such a manner as to be overlapped on a rendering location of characters adjacent thereto. Accordingly, in creating the sentence, the characters to be stereoscopically displayed and the characters adjacent thereto may be separated widely. Needless to say, in a case of recognizing the characters to be stereoscopically displayed based on the attribute information, the personal computer (word processor, etc.) may automatically execute an editing process for widening intervals between the character to be stereoscopically displayed and the characters adjacent thereto than usual. In addition, a level of transparency (M) may be set as an attribute of the characters to be stereoscopically displayed. For example, the personal computer (word processor, etc.) is capable of obtaining rendering R pixel data as a result of an arithmetic calculation as in $(R2 \cdot M/100 + R1 \cdot (1-M/100))$ where data of an R pixel of the character to be expanded that is designated to be transparent is R1, and data of an R pixel of a character overlapped thereon is R2. This transparent setting may be used for a case that the character to be stereoscopically displayed is displayed in a color different from other characters.

Furthermore, the above example illustrates the personal computer in which the file is recognized and then, the image is displayed. However, in addition thereto, the stereoscopic image display apparatus may be a digital broadcast receiver capable of receiving data broadcast (BML file) and displaying the image, a mobile telephone provided with Internet connection environment and an image displaying function, and etc.

As described above, if a three-dimensional effect is produced on the character or the string of characters constituting the sentence, a visual effect of the sentence is remarkably improved. On the contrary, in a case that electronic text data created on such the character or the string of characters on which the three-dimensional effect is produced is transmitted by electronic mail, etc., and that a display apparatus on a receiver side is not provided with a function for the 3D display, there occurs inconvenience that such the electronic text data cannot be readily displayed.

As described above, the electronic text data is often described in a format such as XML, and the above 3D effect is realized as a result of the tags being described in the character or the string of characters as the attribute information, for example. Therefore, if the attribute indicating the 3D effect is deleted from the electronic text data, and the attribute of the string of characters is changed to an attribute (no attribute is specified) indicating a normal two-dimensional display (2D display), it becomes possible to display the received electronic text data as a normal string of characters even if the apparatus on a receiver side is not provided with a corresponding function. However, if this is done, a display effect added by a text creator is ruined, and in addition, it is probable that an intention of the text creator is not correctly transmitted to the receiver side.

Hereinafter, another embodiment of the present invention will be described by referring to Figures. Firstly, FIG. 19 shows a function block of a text conversion processing tool relating to the embodiment.

It is noted that the function block shown in FIG. 19 is realized if a program or a database for executing each function in a coordinating manner is mounted in the apparatus, and the CPU is thereby provided with a similar function. Herein, the program and the database may be mounted in the apparatus in advance, or, may be installed from outside as required. In order to carry out such the install, the program and the database may be downloaded using a public network such as the Internet, etc., and in addition, such the install can be also possible using a method in which a storing medium (disk, etc.) that the program and the database is stored is attached to the apparatus, and the install is processed accordingly.

As shown in FIG. 19, the text conversion processing tool is composed of a text searching portion 201, a text conversion portion 202, and a conversion rule retaining portion 203.

The text searching portion 201 searches the characters or the string of characters to which the certain attributes are added, out of input text data T1, according to a conversion rule table retained in the conversion rule retaining portion 203. The text conversion portion 202 converts the attribute information on the characters or the string of characters searched by the text searching portion 201 according to a conversion rule retained in the conversion rule retaining portion 203, and outputs output text data T2. The conversion rule retaining portion 203 stores the conversion rule table for converting certain attribute information into another attribute information, out of the attribute information on the characters or the string of characters included in the input text data T1.

FIG. 20 shows a configuration example of the conversion rule table when the input text data T1 is 3D text data and the output text data T2 is 2D text data. It is noted that herein, the 3D text data and the 2D text data are described in an XML format.

In such the configuration example, the conversion rule table includes a conversion rule for converting tags for producing the 3D effect on the characters or the string of characters into attribute information for producing a 2D decorated character (italic character) on the characters or the string of characters, and a conversion rule for increasing a font size (attribute) of such the characters or the string of characters corresponding to a level of the 3D effect (protruding amount). Herein, the font size is set in such a manner as to increase only by 1 pt (point) per each protruding amount.

In FIG. 20, <text font=12pt> described in each text data indicates that data succeeding thereto is text data of which font size is 12 pt, and </text> indicates an end of the text data. In addition, <3D d=2> and <3D d=1> described in the three-dimensional text data indicate that the three-dimensional effect is produced on the characters or the string of characters succeeding thereto, and in addition, levels of the protruding amounts of the characters or the string of characters are a level 2 (d=2) and a level 1 (d=1). Herein, the larger values of the levels, the larger the protruding amounts.

In addition, <it font=14 pt> and <it font=13 pt> described in the 2D text data indicate that the character decorations in which font sizes are 14 pt and 13 pt and in which fonts are italic (it: italic) are produced on the characters or the string of characters succeeding thereto, and </it> indicates an end of the character decorations.

FIG. 21 shows a flowchart at a time of converting the input text data T1 according to such the conversion table.

When a conversion process is started, the input text data T1 (3D) is input into the text searching portion 201 (S101), and characters or a string of characters to which the tags for producing the 3D effect is added are searched out of the characters or the string of characters in the input text data T1 (S102). At this time, if there are the characters or the string of characters to which the tags for producing the 3D effect is added, the protruding amounts of the characters or the string of characters are extracted at the same time. Then, extracted information, the input text data T1, and the conversion rule table retained in the conversion rule retaining portion 203 are provided to the text conversion portion 202 (S103).

According to the conversion rule table, the text conversion portion 202 converts the tags of the characters or the string of characters searched in the above S102 into the tags for meaning the fonts of the characters or the string of characters to italic (it: italic), increases the font sizes of the characters or the string of characters by corresponding to the 3D protruding amount, and converts the characters or the string of characters into the two-dimensional text data (S104). Then, the text conversion portion outputs the converted text data as the output text data T2.

FIG. 22 shows a display example in such the case. A lower left side of FIG. 22 shows a display example when the input text data T1 (3D) is 3D-displayed, and a lower right side of FIG. 22 shows a display example when the converted output text data T2 (2D) is 2D-displayed.

As shown in FIG. 22, the above-described process makes it possible to convert the string of characters on which the 3D-dimensional effect has been (was due to be) produced (a string of characters in a portion surrounded by dotted lines in FIG. 22) into a string of italic characters in an expanded and two-dimensional display manners. Therefore, it is possible to emphasize the string of characters on which the 3D effect has been (was due to be) produced in the two-dimensional display. As a result of this conversion, it is possible that an intention of the creator who created the input text data T1 is reflected on the two-dimensional display, and even in an apparatus only provided with the two-dimensional display function, it is possible to appropriately transmit and display the information according to the intention of the creator.

It is noted in the above, when the 3D text data is converted into the 2D text data, a style of the character decoration (italic) and the font size are simultaneously converted. However, even if only the style of the character decoration (italic) is converted, or if only the font size is converted, it is still possible to demonstrate an emphasizing effect of the string of 3D characters.

In addition, in the above, the style of the character decoration is italic. However, it may be possible to adopt other character decoration styles approximate to the 3D display such as a shaded character, a bold character, etc.

Furthermore, in the above, the protruding amount of the 3D effect is simply expressed by a magnitude of numerical values (d=1, 2, . . . ). However, it is also possible to express by units such as mm (millimeter), cm (centimeter), etc., or a description of a measurement such as "large", "medium", "small", etc., too. It is noted that in this case, too, regarding the size of the font, a point size may be changed corresponding to the protruding amount.

Incidentally, the above illustrates an example that the conversion rule table converts the 3D text data into the 2D text data, a process flow and an example of displayed output using the conversion rule table. In addition to this configuration, it is also possible to create a conversion rule table for converting the 2D text data into the 3D text data. For example, contrary to the above example, in a case that tags for producing the 2D character decoration (italic, for example) on the characters or the string of characters are described, it may be possible that a conversion rule for converting the tags of the 2D characters or the string of 2D characters into tags for producing the 3D effect is included in the conversion rule table, or in a case that attribute information for making the font sizes of the characters or the string of characters larger than normal is described, it is possible that a conversion rule for converting the attribute information into attribute information for allowing the characters or the string of characters to be stereoscopically displayed by a protruding amount corresponding to an increase of the font sizes is included in the conversion rule table.

For example, contrary to the above-described conversion of the 3D into the 2D, if it is defined by the conversion rule that the tags of the character is italic, and that the tags are converted into tags for producing the 3D effect of the protruding amount corresponding to the font size of the character decoration, it is possible to convert the 2D text data shown in FIG. 22 into the 3D text data of FIG. 22. Thus, as a lower left side of FIG. 22 shows, it becomes possible to 3D-display these characters or the string of characters in a more impressive manner than a normal two-dimensional display.

In addition, in the above, although the data is described in the XML format, another format may be used. It is possible to use an arbitrary data format in which attributes such as a font, italic, a 3D, etc. are applied as the decoration information partially toward the characters or the string of characters.

SPECIFIC EXAMPLE

A specific example of a case that the above-described text conversion process tool is applied to a mobile terminal device will be shown. FIG. 23 is a diagram showing a configuration of the mobile terminal device.

It is noted that in this specific example, the above-described text conversion process tool is mounted by being downloaded into a memory inside the mobile terminal device from a public network via a communication module 101 shown in FIG. 23, for example. In addition, it is noted that the mobile terminal device shown in FIG. 23 is not provided with the 3D display function. Thus, the mounted text conversion tool is a tool for executing a function for converting the 3D text data into the 2D text data.

As shown in FIG. 23, the mobile terminal device is provided with the communication module 101, a communication processing portion 102, an operation panel 103, an input processing portion 104, a monitor panel 105, a display controller 106, an audio input/output interface 107, an audio processing portion 108, a CPU 109, and a RAM 110.

The communication module 101 is provided with a wireless communication module such as an antenna, etc., and carries out a communication with the public network via radio wave. The communication processing portion 102 applies a process corresponding to a communication protocol toward data to be transmitted and received via the communication module 101.

The operation panel 103 is provided with operation means such as an operation key, etc., and outputs a signal corresponding to an operation result to the input processing portion 104. The input processing portion 104 converts the signal received from the operation panel 103 into data, and outputs the data to the CPU 109.

The monitor panel 105 is provided with display means such as a liquid crystal monitor, etc., and displays a display screen corresponding to a process from the display controller 106. The display controller 106 generates the display screen according to image data input from the CPU 109, and displays the display screen on the monitor panel 105.

The audio input/output IF (interface) 107 is provided with an interface for inputting/outputting audio, outputs an audio signal input from an audio inputting means to the audio processing portion 108, and outputs from an audio outputting means the audio corresponding to the audio signal received from the audio processing portion 108. The audio processing portion 108 converts into audio data the audio signal received from the audio inputting/outputting IF 107, and outputs the audio data to the CPU 109. In addition, the audio processing portion 108 converts into the audio signal the audio data received from the CPU 109, and outputs the audio signal to the audio inputting/outputting IF 107.

The CPU 109 executes various kinds of processes according to various kinds of programs mounted in the mobile terminal device. The RAM 110 sequentially stores various kinds of data handled by the CPU 109.

For example, upon receipt of electronic mail data including a text data file from the public network, such the electronic mail data is obtained and analyzed by the CPU 109 according to an electronic mail processing program, and is stored in the RAM 110. At this time, if the text data file stored in the RAM 110 is the three-dimensional text data, this data is applied to a conversion process by the CPU 119, and converted into the two-dimensional text data according to a text data conversion processing program, and is stored into the RAM 110 as another file. It is noted that such the conversion process is carried out according to the descriptions referring to FIG. 19 to 22.

Thereafter, if a display instruction of such the text data file is input via the operation panel 103, the CPU 109 reads out the two-dimensional text data from the RAM 110 so as to generate the image data, and outputs this image data to the display controller. Upon receipt of this image data, the display controller 106 generates an image corresponding to the two-dimensional text data, and displays this image on the monitor panel 105. As a result, an image as shown on a lower right side of FIG. 22 is displayed on the monitor panel 105, for example.

It is noted that in this embodiment, by taking an example of the mobile terminal device not having the 3D display function, an applicable example of the above embodiment is described. However, in a case of adapting the above embodiment to a mobile terminal device having the 3D display function, instead of the text conversion tool for executing the function of converting the 3D text data into the 2D text data, a text conversion tool for executing a function of converting the 2D text data into the 3D text data is mounted in the mobile terminal device. In this case, the text conversion tool is activated in a case that the text data file received by an electronic mail system is the 2D text data, and a process for converting the 2D text data into the 3D text data is executed by the CPU 109. Then, the converted 3D text data is stored in the RAM 110 as another file. It is noted that regarding the conversion process, see above.

It is noted that in this case, it is possible to display the text data either in a 3D manner or a 2D manner. Therefore, it may be possible that the user is asked which display manner the user may choose, and corresponding to a selection instruction in response thereto, the display manner of the output (3D manner or 2D manner) is appropriately set. Or, it may be possible that the display is usually performed in the 3D manner, and corresponding to a switch instruction from the user, the display is changed to the 2D manner. In addition, on the contrary, it may also be possible that the display is usually performed in the 2D manner, and corresponding to the switch instruction from the user, the display is changed to the 3D manner.

It is noted that in any case of the embodiments, the text data based on any display manner, that is, the 3D manner or the 2D manner, may be sent to a transmission destination at a time of transferring electronic mail. Therefore, at a time of transferring the electronic mail, the user may be asked which text data, that is, text data yet to be converted or text data already converted, the user may choose to transmit.

In addition, besides electronic mail data, in browsing a homepage having three-dimensional tags, too, the above conversion process may be carried out corresponding to the display manners, that is, the 3D manner or the 2D manner, of the receiving terminal.

Although the present invention has been described and illustrated in detail, it is clearly understood that the same is by way of illustration and example only and is not to be taken by way of limitation, the spirit and scope of the present invention being limited only by the terms of the appended claims.

BRIEF DESCRIPTION OF THE DRAWINGS

FIG. 3 is a view showing an embodiment of the present invention, and a descriptive diagram of a stereoscopic viewing-use rendering process of a file by a personal computer (browser software);

FIG. 4 is a view showing an embodiment of the present invention, and a descriptive diagram of a stereoscopic viewing-use rendering process of a file by a personal computer (browser software);

FIG. 5 is a view showing an embodiment of the present invention, and a descriptive diagram showing a description example of a file;

FIG. 6 is a view showing an embodiment of the present invention, and a descriptive diagram showing a description example of a file;

FIG. 7 is a view showing an embodiment of the present invention, and a descriptive diagram showing a description example of a file;

FIG. 8 is a view showing an embodiment of the present invention, and a descriptive diagram showing a description example of a file;

FIG. 9 is a view showing an embodiment of the present invention, and a descriptive diagram showing a description example of a file;

FIG. 11 is a view showing an embodiment of the present invention, and a descriptive diagram showing a description example of a file;

FIG. 13 is a view showing an embodiment of the present invention;

Figure 1:
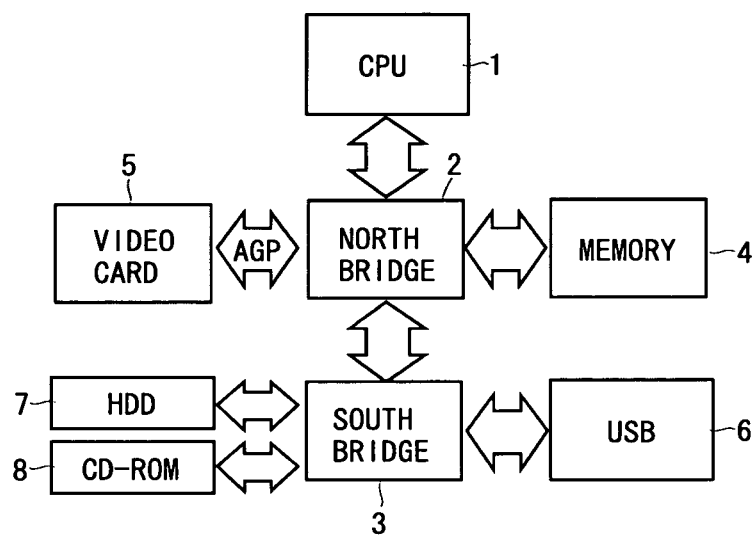
FIG. 1 is a view showing an embodiment of the present invention, and a block diagram showing an example of architecture of a personal computer.
Figure 2:
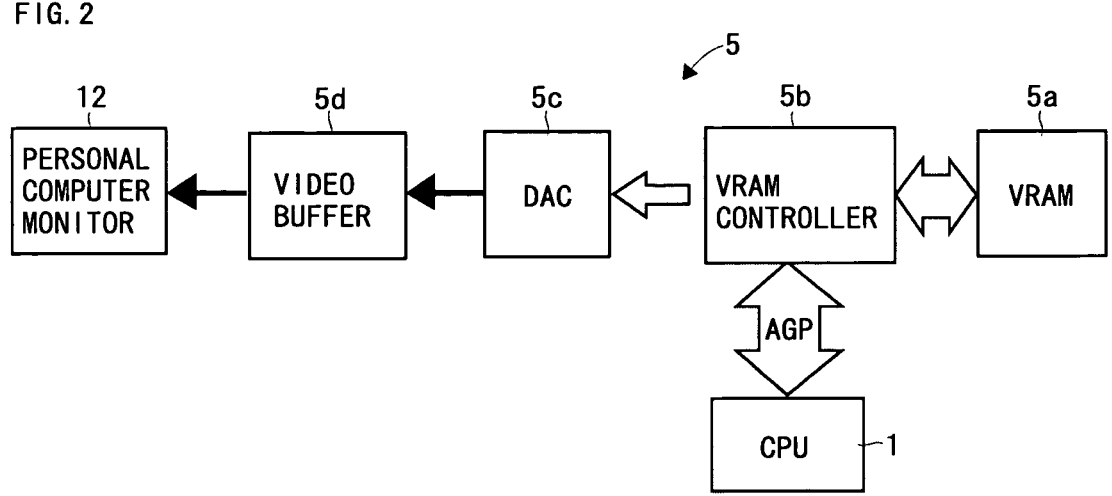
FIG. 2 is a view showing an embodiment of the present invention, and a block diagram showing an example of a configuration of a video card.
Figure 10:
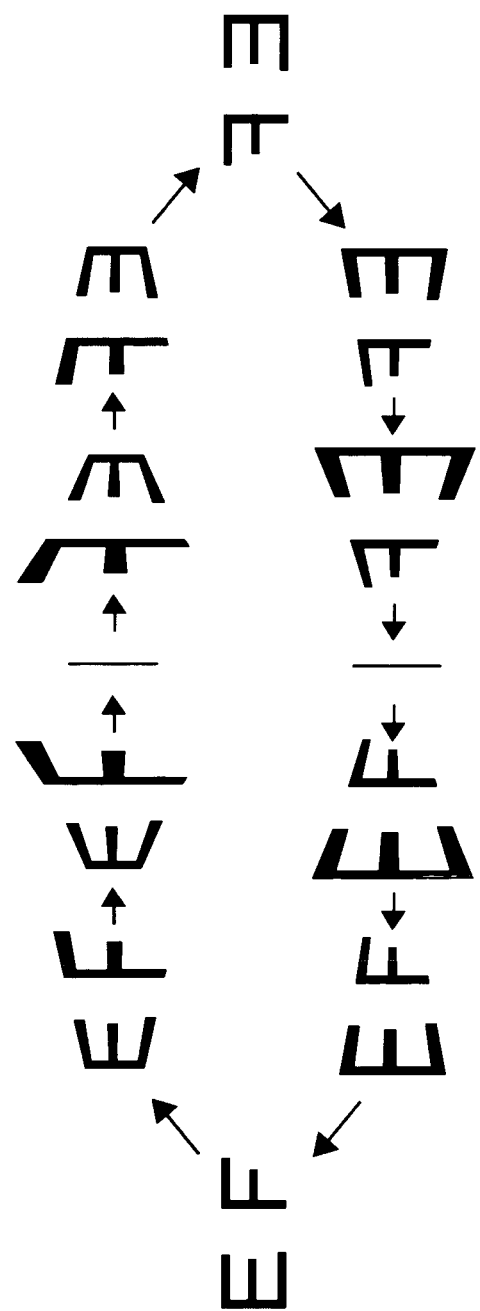
FIG. 10 is a view showing an embodiment of the present invention, and a descriptive diagram showing an example of a rotating image.
Figure 12:
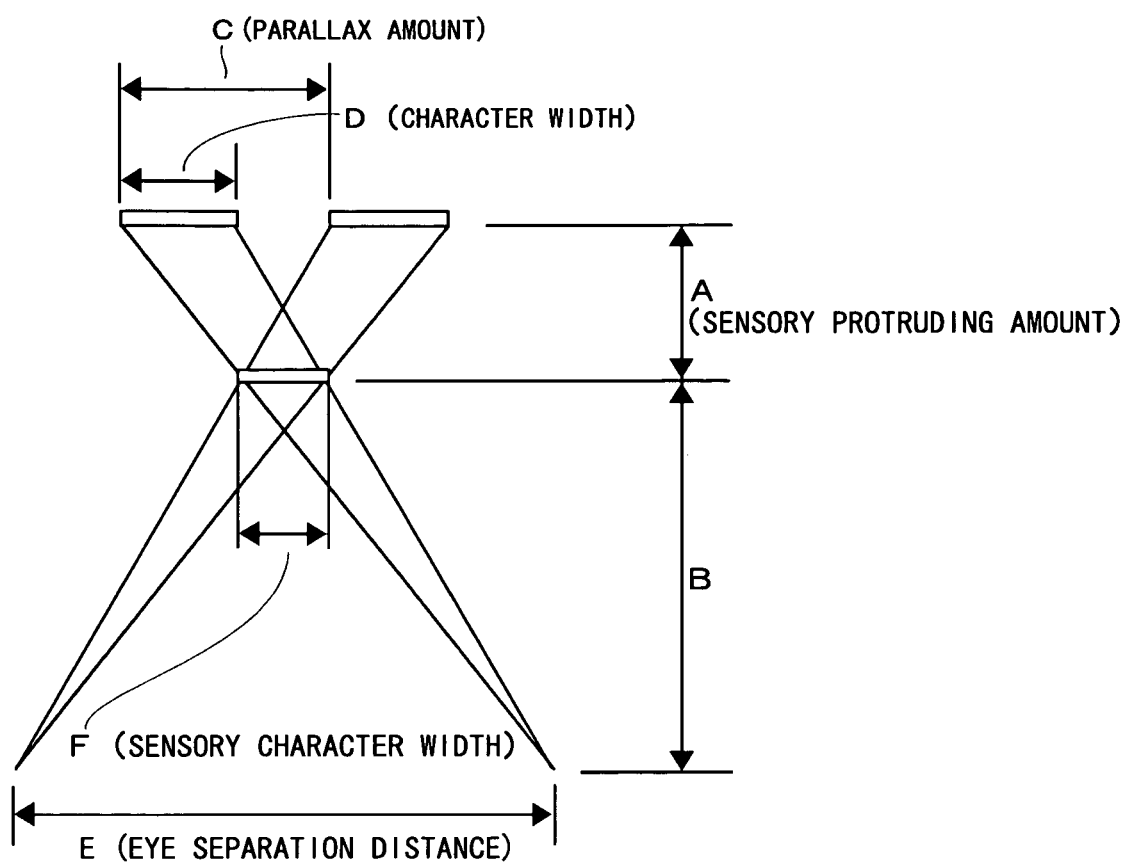
FIG. 12 is a view showing an embodiment of the present invention, and a descriptive diagram showing a principle of a stereoscopic viewing.
Figure 19:
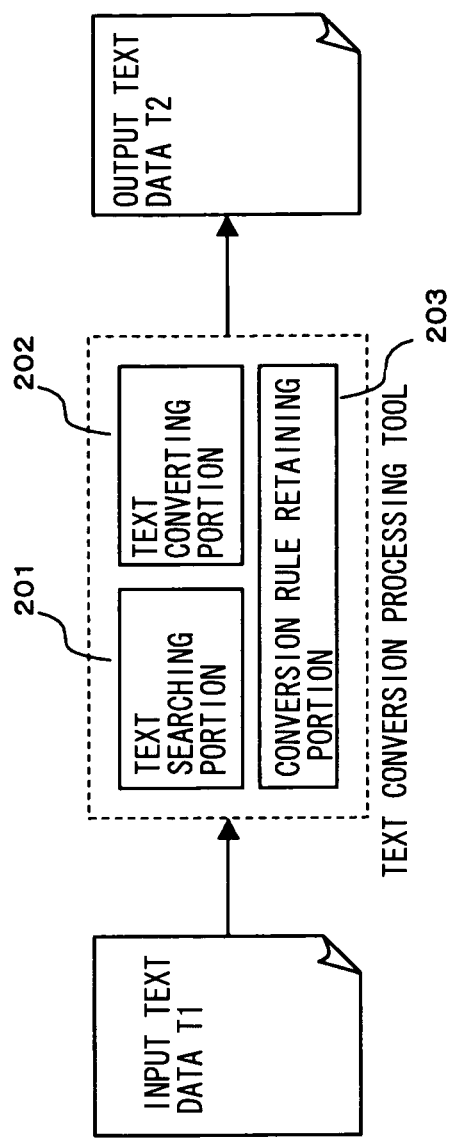
Figure 20:
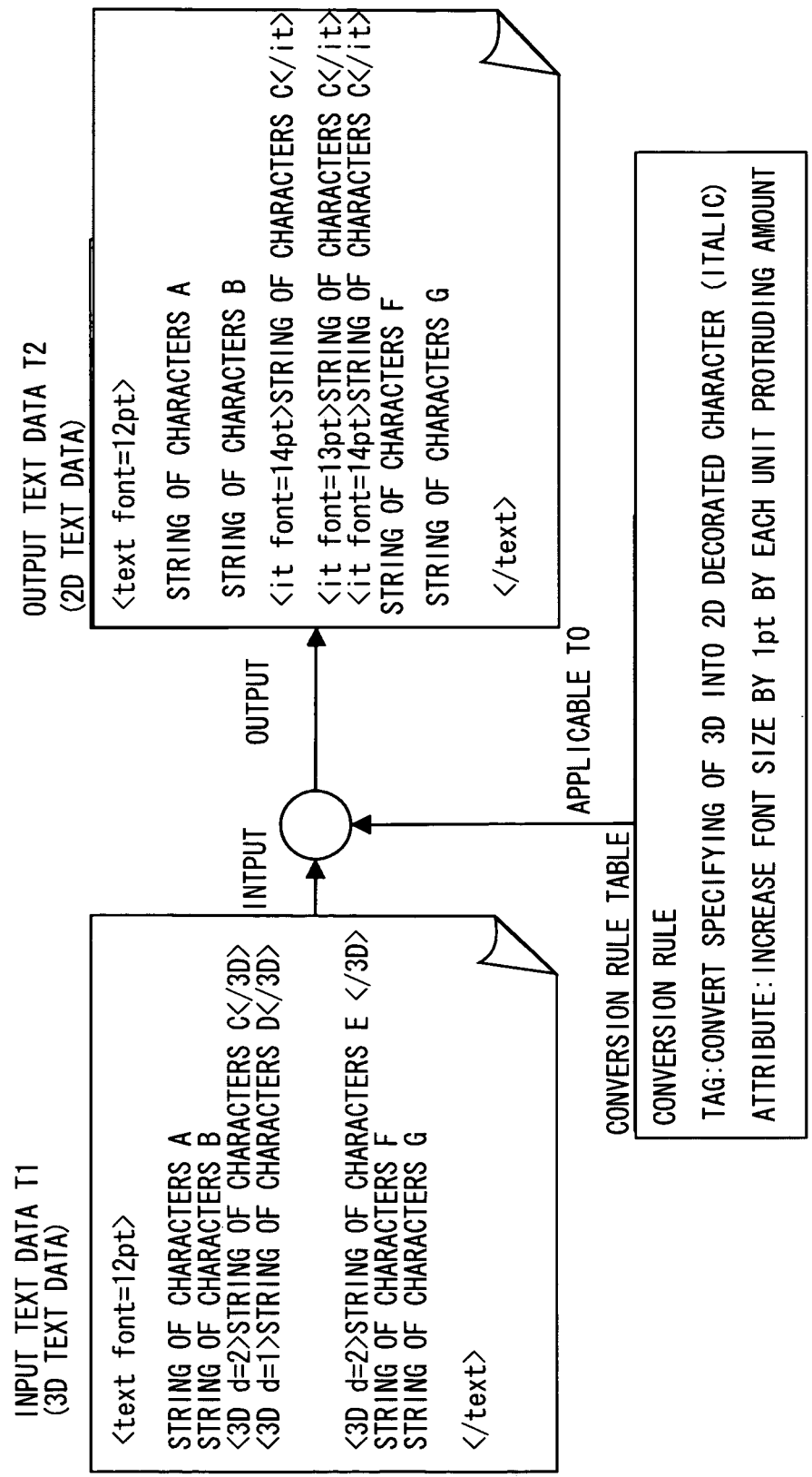
Figure 21:
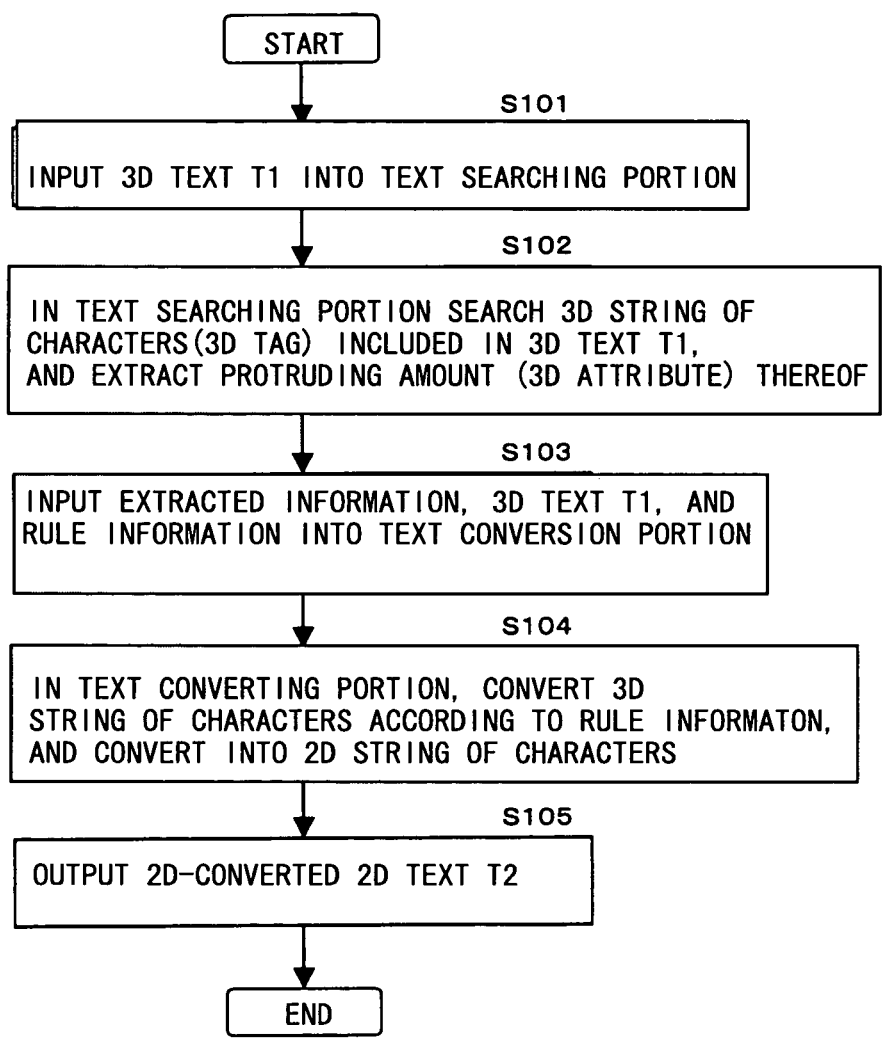
Figure 22:
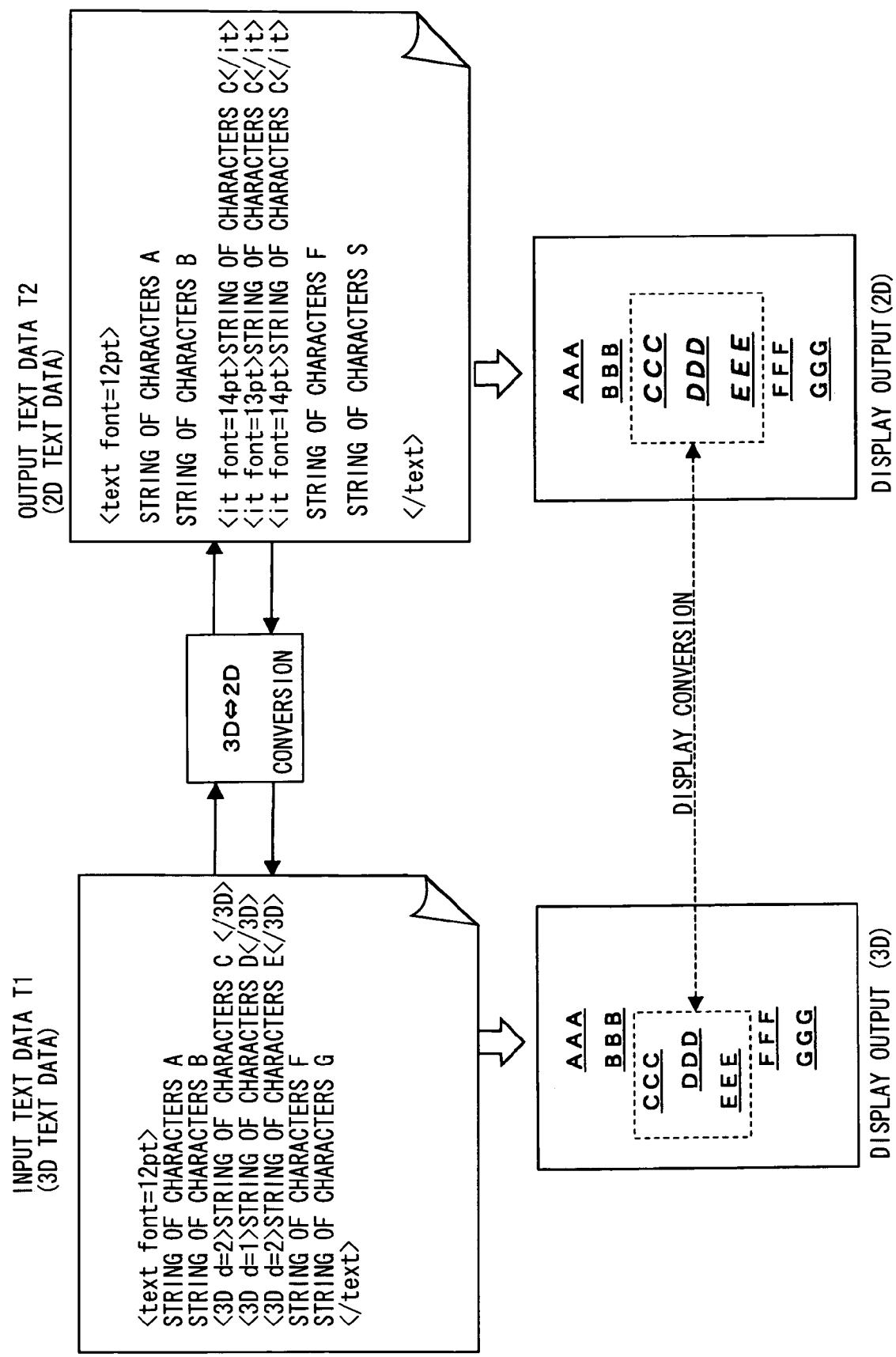
Figure 23:
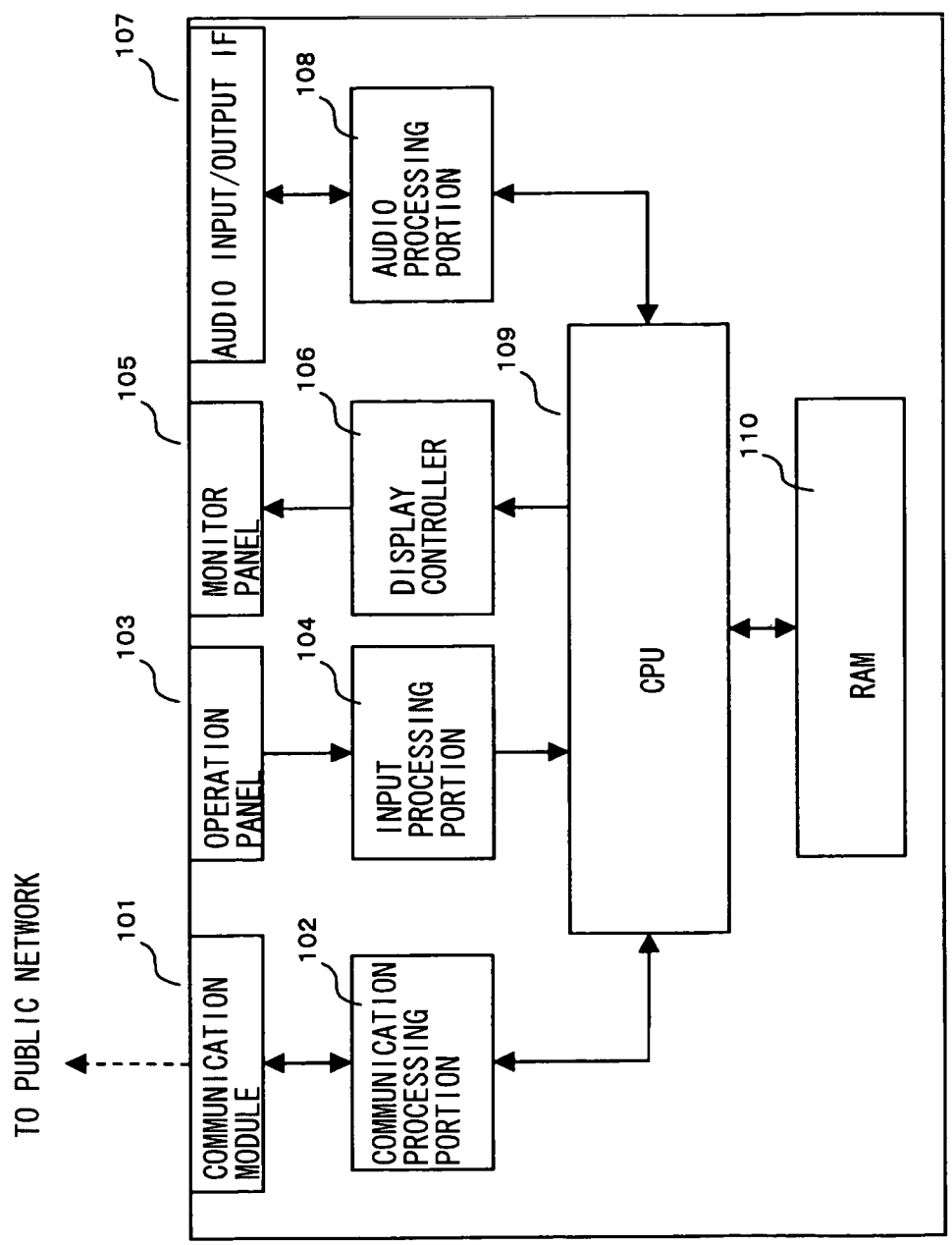

A portion (a) of FIG. 13 is an example of a non-stereoscopic display;

Portions (b), (c) of FIG. 13 are descriptive diagrams showing examples of a stereoscopic display in which a size of characters to be stereoscopically viewed is expanded;

FIG. 14 is a view showing an embodiment of the present invention;

A portion (a) of FIG. 14 is a descriptive diagram of a non-stereoscopic display of "Σ";

A portion (b) of FIG. 14 is a descriptive diagram of a stereoscopic display of "Σ";

FIG. 15 is a descriptive diagram of an embodiment of the present invention, and a descriptive diagram of a stereoscopic display of "Σ";

FIG. 16 is a view showing an embodiment of the present invention;

Portions (a), (b), and (c) of FIG. 16 are descriptive diagrams of stereoscopic displays of "Σ";

FIG. 17 is a view showing an embodiment of the present invention;

A portion (a) of FIG. 17 is a descriptive diagram of a non-stereoscopic display of characters with strike-throughs;

A portion (b) of FIG. 17 is a descriptive diagram of a stereoscopic display of characters with strike-throughs;

A portion (c) of FIG. 17 is a descriptive diagram of four kinds of strike-throughs;

FIG. 18 is a view showing an embodiment of the present invention, and a descriptive diagram showing attribute information of each character in a main text;

FIG. 19 is a view showing an embodiment of the present invention, and a functional block diagram of a text conversion tool;

FIG. 20 is a view showing an embodiment of the present invention, and a view of one example of a conversion rule table;

FIG. 21 is a view showing an embodiment of the present invention, and a flowchart showing a text data conversion process;

FIG. 22 is a view showing an embodiment of the present invention, and a view showing an example of a conversion process of text data; and FIG. 23 is a view showing an embodiment of the present invention, and a view showing a configuration of a mobile terminal device.

What is claimed:

1. A stereoscopic image display apparatus for, according to a file, generating a stereoscopic image to be perceived by a user based on a left viewpoint image and a right viewpoint image corresponding respectively to left and right eyes of the user, wherein the apparatus is programmed to:

identify a first object specified in the file as subject to a stereoscopic rendering process which renders the first object with a parallax amount between the left viewpoint image and right viewpoint image;

identify a second object specified in the file as rendered adjacent to the first object in a horizontal direction and rendered with no parallax between the left viewpoint image and the right viewpoint image;

determine the parallax amount and a deviation direction for rendering the first object in the left viewpoint image and the right viewpoint image based on the file;

render the first object at a first horizontal position in the left viewpoint image and a second horizontal position in the right viewpoint image based on the parallax amount and the deviation direction such that the first horizontal position is separated from the second horizontal position by the parallax amount; and render the second object at a third horizontal position in the left and right viewpoint images with no parallax, in which the second object is shifted from an original position to the third horizontal position such that the first and second objects do not overlap in either of the left and right viewpoint images.

2. A stereoscopic image display apparatus according to claim 1, wherein the second object is shifted in the deviation direction of the first object by an amount equal to or greater than the parallax amount of the first object.

3. A stereoscopic image display apparatus according to claim 2, wherein shifting the second objection is carried out in accordance with an instruction in the file.

4. A stereoscopic image display apparatus according to claim 1, wherein when the file has information indicating a parallax amount, the parallax amount of the first object is calculated based on information of a previously retained setting table and the information in the file.

5. A stereoscopic image display apparatus according to claim 1, wherein in a case that the first object is stereoscopically displayed on a near side, the first object is expanded and rendered, and in a case that the first object is stereoscopically displayed on a far side, the first object is reduced in size and rendered.

6. A non-transitory processor-readable medium tangibly embodying a set of processor-executable instructions, wherein execution of the instructions causes a processor to perform operations including according to a file, generating a stereoscopic image to be perceived by a user based on a left viewpoint image and a right viewpoint image corresponding respectively to left and right eyes of the user, the operation comprising:

identifying a first object specified in the file as subject to a stereoscopic rendering process which renders the first object with a parallax amount between the left viewpoint image and right viewpoint image;

identifying a second object specified in the file as rendered adjacent to the first object in a horizontal direction and rendered with no parallax between the left viewpoint image and the right viewpoint image;

determining the parallax amount and a deviation direction for rendering the first object in the left viewpoint image and the right viewpoint image based on the file;

rendering the first object at a first horizontal position in the left viewpoint image and a second horizontal position in the right viewpoint image based on the parallax amount and the deviation direction such that the first horizontal position is separated from the second horizontal position by the parallax amount; and rendering the second object at a third horizontal position in the left and right viewpoint images with no parallax, in which the second object is shifted from an original position to the third horizontal position such that the first and second objects do not overlap in either of the left and right viewpoint images.

7. The medium according to claim 6, wherein the second object is shifted in the deviation direction of the first object by an amount equal to or greater than the parallax amount of the first object.

8. The medium according to claim 7, wherein shifting the second objection is carried out in accordance with an instruction in the file.

9. The medium according to claim 6, wherein when the file has information indicating a parallax amount, the parallax amount of the first object is calculated based on information of a previously retained setting table and the information in the file.

10. The medium according to claim 6, wherein the operations further comprise expanding and rendering the first object in a case that the first object is stereoscopically displayed on a near side, and reducing in size and rendering the first object in a case that the first object is stereoscopically displayed on a far side.

* * * * *